US009622049B2

(12) United States Patent
Vetter et al.

(10) Patent No.: US 9,622,049 B2
(45) Date of Patent: Apr. 11, 2017

(54) METHOD AND APPARATUS FOR PROVIDING DUAL PROTOCOL MBMS FOR FACILITATING IPV4 TO IPV6 MIGRATION IN E-UTRAN

(71) Applicants: Richard Vetter, Succasunna, NJ (US); Tomas S. Young, Parsippany, NJ (US); Bruno Landais, Pleumeur-Bodou (FR); Claude Jacob, La Chapelle des Fongeretz (FR)

(72) Inventors: Richard Vetter, Succasunna, NJ (US); Tomas S. Young, Parsippany, NJ (US); Bruno Landais, Pleumeur-Bodou (FR); Claude Jacob, La Chapelle des Fongeretz (FR)

(73) Assignee: Alcatel Lucent, Boulogne-Billancourt (FR)

( * ) Notice: Subject to any disclaimer, the term of this patent is extended or adjusted under 35 U.S.C. 154(b) by 180 days.

(21) Appl. No.: 14/328,249

(22) Filed: Jul. 10, 2014

(65) Prior Publication Data
US 2016/0014572 A1    Jan. 14, 2016

(51) Int. Cl.
*H04W 4/06* (2009.01)
*H04L 29/06* (2006.01)
(Continued)

(52) U.S. Cl.
CPC ............ *H04W 4/06* (2013.01); *H04L 69/167* (2013.01); *H04L 12/189* (2013.01); *H04W 80/045* (2013.01)

(58) Field of Classification Search
CPC ...................................................... H04W 4/06
(Continued)

(56) References Cited

U.S. PATENT DOCUMENTS

| 9,131,003 B2 * | 9/2015 | Chun ................... H04W 28/06 |
| 2005/0037768 A1 * | 2/2005 | Hwang ................ H04L 12/189 |
| | | 455/450 |

(Continued)

FOREIGN PATENT DOCUMENTS

WO    WO 2015027357 A1 *    3/2015    ............. H04L 29/06

OTHER PUBLICATIONS

International Search Report PCT/ISA/210 and Written Opinion of the International Searching Authority PCT/ISA/237 for International Application No. PCT/US2015/038728 dated Sep. 24, 2015.

(Continued)

*Primary Examiner* — Parth Patel
(74) *Attorney, Agent, or Firm* — Harness, Dickey & Pierce, P.L.C.

(57) ABSTRACT

A method of facilitating multimedia broadcast multicast services (MBMS) in a communications network including one or more first evolved node Bs (eNBs) having backhaul interfaces for a first internet protocol (IP) version and one or more second eNBs having backhaul interfaces for a second IP version includes receiving, at a first network element, an initial MBMS content stream; generating, at the first network element, based on the initial MBMS content stream, a first MBMS content stream and a second MBMS content stream; transmitting the first MBMS content stream from the first network element to the one or more first eNBs using a first IP multicast address of the first IP version; and transmitting the second MBMS content stream from the first network element to the one or more second eNBs using a second IP multicast address of the second IP version.

26 Claims, 10 Drawing Sheets

(51) Int. Cl.
    *H04L 12/18*    (2006.01)
    *H04W 80/04*    (2009.01)
(58) Field of Classification Search
    USPC ....... 370/312, 252, 328, 216, 329, 332, 389, 370/400, 401
    See application file for complete search history.

(56) References Cited

U.S. PATENT DOCUMENTS

| | | | |
|---|---|---|---|
| 2005/0117538 A1* | 6/2005 | Van Ewijk | H04L 12/1836 370/328 |
| 2008/0253322 A1* | 10/2008 | So | H04L 12/189 370/329 |
| 2008/0317052 A1* | 12/2008 | Cai | H04L 69/04 370/401 |
| 2010/0027541 A1* | 2/2010 | Eriksson | H04W 72/005 370/390 |
| 2010/0080163 A1* | 4/2010 | Krishnamoorthi | H04L 12/189 370/312 |
| 2010/0265867 A1* | 10/2010 | Becker | H04W 72/005 370/312 |
| 2011/0038372 A1* | 2/2011 | Wijayanathan | H04W 8/26 370/389 |
| 2012/0263089 A1* | 10/2012 | Gupta | H04W 72/005 370/312 |
| 2013/0016645 A1* | 1/2013 | Moriwaki | H04L 12/185 370/312 |
| 2013/0058234 A1* | 3/2013 | Yang | H04L 27/261 370/252 |
| 2013/0155937 A1* | 6/2013 | Aramoto | H04L 12/2838 370/312 |
| 2013/0188547 A1* | 7/2013 | Moriwaki | H04W 72/005 370/312 |
| 2013/0279394 A1* | 10/2013 | Aramoto | H04W 76/002 370/312 |
| 2014/0105044 A1* | 4/2014 | Baillargeon | H04L 43/0835 370/252 |
| 2014/0153544 A1* | 6/2014 | Lu | H04W 8/26 370/331 |
| 2014/0153546 A1* | 6/2014 | Kim | H04W 48/18 370/332 |
| 2014/0286221 A1* | 9/2014 | Chandramouli | H04W 76/002 370/312 |
| 2014/0313974 A1* | 10/2014 | Chandramouli | H04W 4/06 370/328 |
| 2014/0344441 A1* | 11/2014 | Janakiraman | H04L 43/12 709/224 |
| 2015/0119023 A1* | 4/2015 | Wang | H04W 4/06 455/432.1 |
| 2015/0195684 A1* | 7/2015 | Lohmar | H04W 4/06 370/312 |
| 2015/0207777 A1* | 7/2015 | Chilla | H04L 61/2015 709/203 |
| 2015/0207838 A1* | 7/2015 | Gabin | H04L 65/4084 709/219 |
| 2015/0257127 A1* | 9/2015 | Huarui | H04W 4/06 370/312 |
| 2015/0263847 A1* | 9/2015 | Baillargeon | H04L 7/0008 370/216 |
| 2016/0014572 A1* | 1/2016 | Vetter | H04L 69/167 370/312 |
| 2016/0057801 A1* | 2/2016 | Xia | H04W 76/027 370/221 |

OTHER PUBLICATIONS

SA2: "LS on MME control for consistence of S1-U and S1-MME address type", 3GPP Draft; S2-142009 LS on MME Control for Consistence of S1-U and S1-MME Address Type, 3rd Generation Partnership Project(3GPP). Mobile Competence Centre; 650, Route Des Lucioles ; F-06921 Sophia-vol. SA WG2, No. Phoenix, USA; 20140519-20140523 May 26, 2014 (May 26, 2014), XP050836511.
Alcatel-Lucent et al: "Support of a mix of IPv4 and IPv6 eNBs and backhauls in eMBMS", 3GPP Draft; S2-150209 DP EMBMS IP Types Support, 3rd Generation Partnership Project (3GPP), Mobile Competence Centre ; 650, Route Des Lucioles ; F-06921 Sophia-Antipolis Cedex ; France vol. SA WG2, No. Sorrento, Italy; 20150126-20150130 Jan. 25, 2015 (Jan. 25, 2015), XP050942182.
3rd Generation Partnership Project; Technical Specification Group Services and System Aspects; Multimedia Broadcast/Multicast Service (MBMS); Architecture and functional description (Release 12); GPP TS 23.246; V12.2.0; Jun. 2014.
3rd Generation Partnership Project; Technical Specification Group Core Network and Terminals; Interworking between the Public Land Mobile Network (PLMN) supporting packet based services and Packet Data Networks (PDN) (Release 12); 3GPP TS 29.061; V12.6.0; Jun. 2014.
3rd Generation Partnership Project; Technical Specification Group Core Network and Terminals; 3GPP Evolved Packet System (EPS); Evolved General Packet Radio Service (GPRS) Tunnelling Protocol for Control plane (GTPv2-C); Stage 3 (Release 12); GPP TS 29.274; V12.5.0; Jun. 2014.
3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; STage 2 (Release 12); 3GPP TS 36.300; V12.2.0; Jun. 2014.
3rd Generation Partnership Project; Technical Specification Group Radio Access Network; Evolved Universal Terrestrial Radio Access Network (E-UTRAN); General aspects and principles for interfaces supporting Multimedia Broadcast Multicast Service (MBMS) within E-TRAN (Release 11); 3GPP TS 36.440; V11.2.0; Mar. 2013.
International Preliminary Report on Patentability for International Application No. PCT/US2015/038728 mailed on Jan. 19, 2017.

* cited by examiner

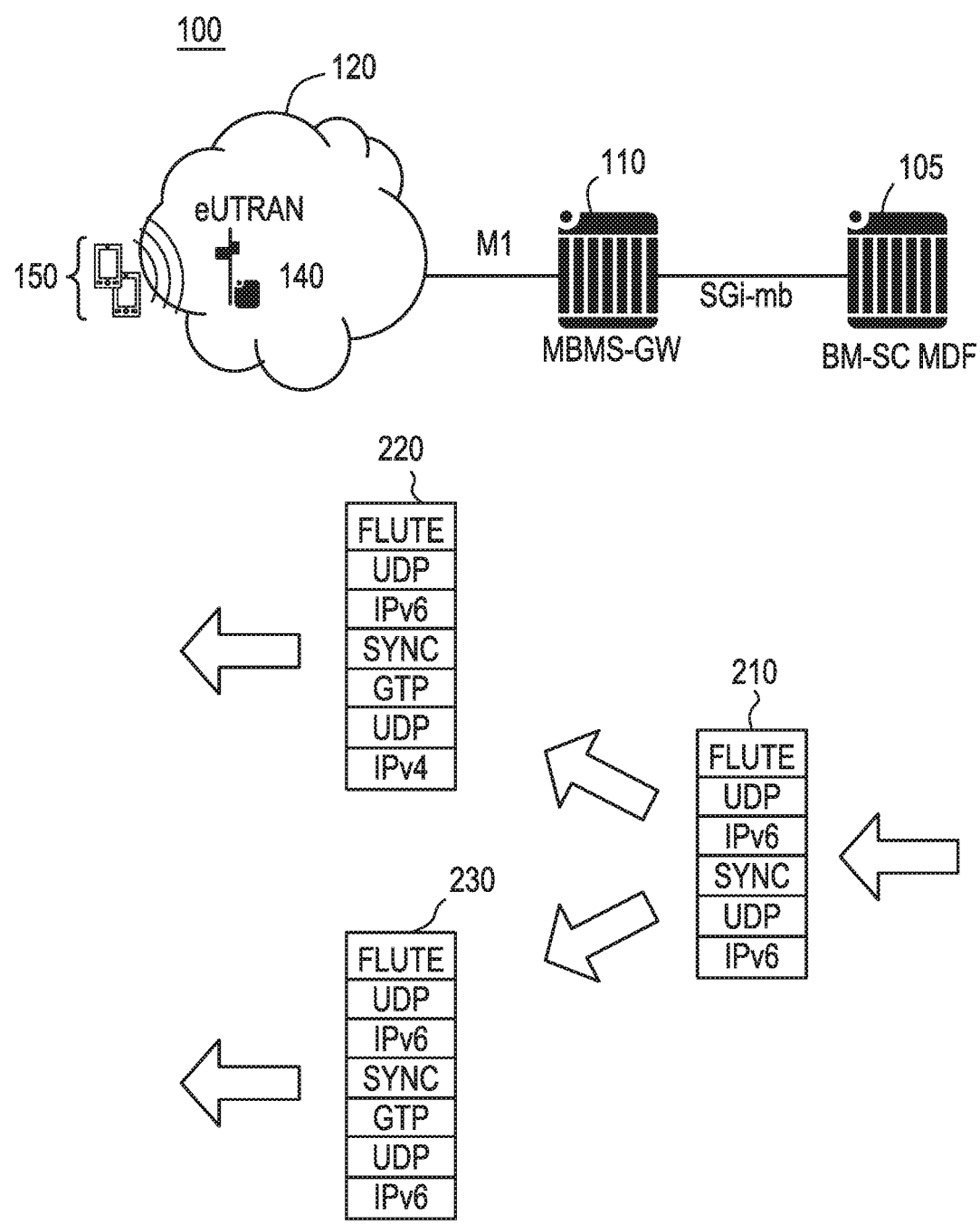

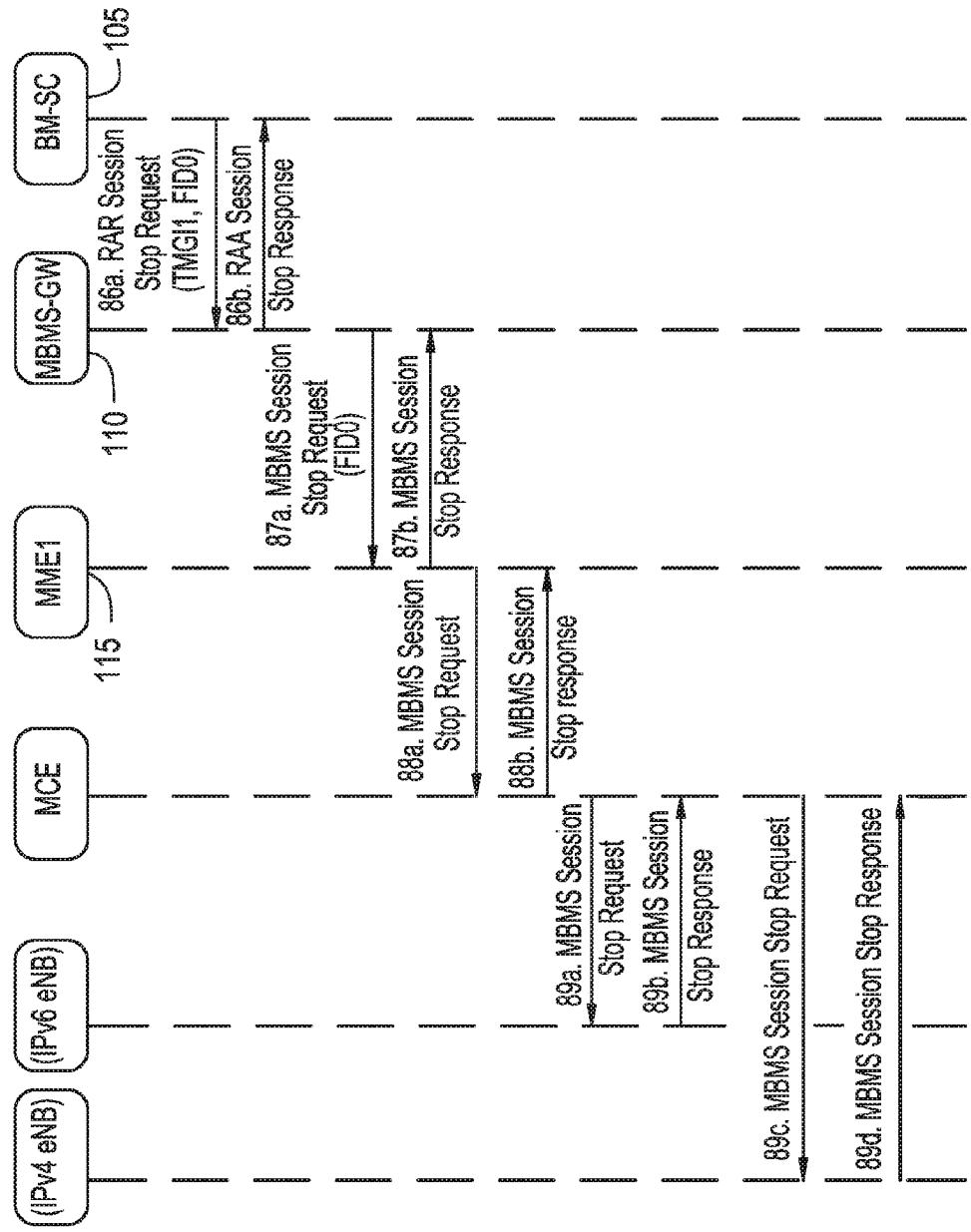

METHOD AND APPARATUS FOR PROVIDING DUAL PROTOCOL MBMS FOR FACILITATING IPV4 TO IPV6 MIGRATION IN E-UTRAN

BACKGROUND OF THE INVENTION

1. Field

The present invention relates generally to providing multimedia broadcast multicast services (MBMS) for networks that have mixed internet protocols.

2. Related Art

Multimedia broadcast multicast services (MBMS) and enhanced MBMS (eMBMS) refer to procedures and interfaces specified for 3GPP wireless communications networks that provide point-to-multipoint connections. MBMS may be used to provide multicast and broadcast services over, for example, long term evolution (LTE) networks.

SUMMARY OF THE INVENTION

At least some example embodiments provides a method of facilitating multimedia broadcast multicast services (MBMS) in a communications network including one or more first evolved node Bs (eNBs) and one or more second eNBs, the one or more first eNBs each having backhaul interfaces for a first internet protocol (IP) version, the one or more second eNBs each having backhaul interfaces for a second IP version, the method including receiving, at a first network element, an initial MBMS content stream; generating, at the first network element, based on the initial MBMS content stream, a first MBMS content stream and a second MBMS content stream; transmitting the first MBMS content stream from the first network element to the one or more first eNBs using a first IP multicast address of the first IP version; and transmitting the second MBMS content stream from the first network element to the one or more second eNBs using a second IP multicast address of the second IP version.

According to at least one example embodiment, the one or more first eNBs and the one or more second eNBs are included in a same multicast-broadcast single-frequency network (MBSFN), the generating a first MBMS content stream and a second MBMS content stream includes, generating a synchronization protocol (SYNC) layer of a protocol stack of the first MBMS content stream based on a SYNC layer of a protocol stack of the initial MBMS content stream, and generating a SYNC layer of a protocol stack of the second MBMS content stream based on the SYNC layer of the protocol stack of the initial MBMS content stream, wherein the transmitting the first MBMS content stream includes transmitting the first MBMS content stream from the network element to the one or more first eNBs via a first GTP tunnel using the first IP multicast address, and wherein the transmitting the second MBMS content stream includes transmitting the second MBMS content stream from the network element to the one or more second eNBs via a second GTP tunnel using the second IP multicast address, the first and second MBMS content streams being transmitted from the first network element simultaneously. According to at least one example embodiment, the method further includes sending a first MBMS session start message, the first MBMS session start message including, the first IP multicast address, and a first service area identifier identifying a first service area that has been assigned to only the one or more first eNBs; and sending a second MBMS session start message, the second MBMS session start message including, the second IP multicast address, and a second service area identifier identifying a second service area that has been assigned to only the one or more second eNBs, the one or more first eNBs each having M1 backhaul interfaces for the first internet protocol (IP) version, the one or more second eNBs each having M1 backhaul interfaces for the second IP version.

According to at least one example embodiment, the first network element is an MBMS gateway (MBMS-GW), and the method further includes receiving, at the MBMS-GW, a first session start message, the first session start message identifying both the first service area and the second service area, the first session start message being received from a broadband/multicast— service center (BM-SC).

According to at least one example embodiment, the sending a first MBMS session start message includes sending the first MBMS session start message from the MBMS-GW to one or more mobility management entities (MMEs) associated with the one or more first eNBs upon receiving the first session start message from the BM-SC, and the sending a second MBMS session start message includes sending the second MBMS session start message from the MBMS-GW to one or more MMEs associated with the one or more second eNBs upon receiving the first session start message from the BM-SC.

According to at least one example embodiment, the method further includes receiving or being configured with, at the MBMS-GW, IP version correspondence information indicating that the first service area corresponds to eNBs having M1 backhaul interfaces of the first IP version and the second service area corresponds to eNBs having M1 backhaul interfaces of the second IP version; generating, at the MBMS-GW, the first MBMS session start message and the second MBMS session start message by, inserting the first service area identifier, the first IP multicast address, a first flow ID and a first common tunnel ID identifying a first general packet radio service (GPRS) tunneling protocol (GTP) tunnel into the first MBMS session start message, based on the IP version correspondence information, and inserting the second service area identifier, the second multicast IP address, a second flow ID and a second common tunnel ID identifying a second general packet radio service (GPRS) tunneling protocol (GTP) tunnel in the second MBMS session start message, based on the IP version correspondence information, the first and second flow IDs being different.

According to at least one example embodiment, the receiving a first session start message includes receiving, at the MBMS-GW, a first flow ID in the first session start message, the first flow ID being one of a plurality of flow IDs included in a first pool of flow IDs assigned to the BM-SC, the second flow ID being one of a plurality of flow IDs included in a second pool of flow IDs assigned to the MBMS-GW, no flow IDs included in the first pool being included in the second pool, and no flow IDs included in the second pool being included in the first pool.

According to at least one example embodiment, the method further includes upon receiving a first session update or stop request from the BM-SC at the MBMS-GW, sending a first MBMS session update or stop request to the one or more MMEs associated with the one or more first eNBs, the second MBMS session update including the first flow ID; and sending a second MBMS session update or stop request to the one or more MMEs associated with the one or more second eNBs, the second MBMS session update including the second flow ID.

According to at least one example embodiment, the method further includes sending a MBMS session start message, the MBMS session start message including the first IP multicast address, the second IP multicast address, a first common tunnel ID identifying a first general packet radio service (GPRS) tunneling protocol (GTP) tunnel, and a second common tunnel ID identifying a second GTP tunnel.

According to at least one example embodiment, the first network element is an MBMS gate way (MBMS-GW), and the method further includes receiving, at the MBMS-GW, a first session start message, the first session start message being received from a broadband/multicast— service center (BM-SC), the first session start message identifying at least one of, a first service area to which at least one of the one or more first eNBs and at least one of the one or more second eNBs are assigned, and a plurality of service areas including a service area to which at least one of the one or more first eNBs have been assigned and a service area to which at least one of the one or more second eNBs have been assigned, the one or more first eNBs each having M1 backhaul interfaces for the first internet protocol (IP) version, the one or more second eNBs each having M1 backhaul interfaces for the second IP version.

According to at least one example embodiment, sending a MBMS session start message includes sending the MBMS session start message from the MBMS-GW to one or more mobility management entities (MMEs) upon receiving the first session start message from the BM-SC, each of the one or more MMEs being associated with at least one eNB from among the one or more first eNBs or at least one eNB from among the one or more second eNBs.

According to at least one example embodiment, the method further includes receiving or being configured with, at the MBMS-GW, IP version correspondence information indicating which service areas correspond to which M1 backhaul interface IP versions.

At least some example embodiments provide a method of facilitating multimedia broadcast multicast services (MBMS) in a communications network including one or more first evolved node Bs (eNBs) and one or more second eNBs, the one or more first eNBs each having backhaul interfaces for a first internet protocol (IP) version, the one or more second eNBs each having backhaul interfaces for a second IP version, the method including receiving, at a mobility management entity (MME), a first MBMS session start message, the MBMS session start message including a first IP multicast address of the first IP version, a second IP multicast address of the second IP version, a first common tunnel ID identifying a first general packet radio service (GPRS) tunneling protocol (GTP) tunnel, and a second common tunnel ID identifying a second GTP tunnel, the first MBMS session start message being received from an MBMS gateway (MBMS-GW); and sending, from the MME to one or more multi-cell/multicast coordination entities (MCEs), a second MBMS session start message, the second MBMS session start message including the first IP multicast address, the second IP multicast address, the first common tunnel ID 1, and the second common tunnel ID, each of the one or more MCEs corresponding to one or both of the one or more first eNBs and the one or more second eNBs.

At least some example embodiments provide a method of facilitating multimedia broadcast multicast services (MBMS) in a communications network the method comprising: receiving, at a first evolved node B (eNB), a first MBMS session start message, the MBMS session start message including a first IP multicast address of a first IP version, a second IP multicast address of a second IP version, a first common tunnel ID identifying a first general packet radio service (GPRS) tunneling protocol (GTP) tunnel, and a second common tunnel ID identifying a second GTP tunnel, the first MBMS session start message being received from a mobility management entity (MME); if the first eNB has a backhaul interface of the first IP version type, selecting, at the first eNB, the first IP multicast address; and receiving, at the first eNBs, a first MBMS content stream from an MBMS gateway (MBMS-GW) via the first GTP tunnel using the first IP multicast address; and if the first eNB has a backhaul interface of the second IP version type, selecting, at the first eNB, the second IP multicast address; and receiving, at the first eNBs, a second MBMS content stream from the MBMS gateway (MBMS-GW) via the second GTP tunnel using the second IP multicast address.

At least some example embodiments provide a network element including a processor, the network element being programmed to execute operations for facilitating multimedia broadcast multicast services (MBMS) in a communications network including one or more first evolved node Bs (eNBs) and one or more second eNBs, the one or more first eNBs each having backhaul interfaces for a first internet protocol (IP) version, the one or more second eNBs each having backhaul interfaces for a second IP version, the operations including, receiving, at a the network element, an initial MBMS content stream; generating, at the network element, based on the initial MBMS content stream, a first MBMS content stream and a second MBMS content stream; transmitting the first MBMS content stream from the network element to the one or more first eNBs using a first multicast IP address of the first IP version; and transmitting the second MBMS content stream from the network element to the one or more second eNBs using a second IP multicast address of the second IP version.

According to at least one example embodiment, the network element is programmed such that, transmitting the first MBMS content stream includes transmitting the first MBMS content stream from the network element to the one or more first eNBs via a first GTP tunnel using the first IP multicast address, transmitting the second MBMS content stream includes transmitting, simultaneously with the first MBMS content stream, the second MBMS content stream from the network element to the one or more second eNBs via a second GTP tunnel using the second IP multicast address, when the one or more first eNBs and the one or more second eNBs are included in a same multicast-broadcast single-frequency network (MBSFN), the operation of generating a first MBMS content stream and a second MBMS content stream includes, generating a synchronization protocol (SYNC) layer of a protocol stack of the first MBMS content stream based on a SYNC layer of a protocol stack of the initial MBMS content stream, and generating a SYNC layer of a protocol stack of the second MBMS content stream based on the SYNC layer of the protocol stack of the initial MBMS content stream.

According to at least one example embodiment the operations the network element is programmed to execute further include, sending a first MBMS session start message, the first MBMS session start message including, the first IP multicast address, and a first service area identifier identifying a first service area that has been assigned to only the one or more first eNBs; and sending a second MBMS session start message, the second MBMS session start message including, the second IP multicast address, and a second service area identifier identifying a second service area that has been assigned to only the one or more second eNBs, the one or more first eNBs each having M1 backhaul interfaces for the first internet protocol (IP) version, the one or more second eNBs each having M1 backhaul interfaces for the second IP version.

According to at least one example embodiment, the first network element is an MBMS gateway (MBMS-GW), and the operations the first network element is programmed to execute further include, receiving, at the MBMS-GW, a first session start message, the first session start message being received from a broadband/multicast— service center (BM-SC), and identifying, in the first session start message, both the first service area and the second service area.

According to at least one example embodiment, the MBMS-GW is programmed such that, the operation of sending a first MBMS session start message includes sending the first MBMS session start message from the MBMS-GW to one or more mobility management entities (MMEs) associated with the one or more first eNBs upon receiving to the first session start message from the BM-SC, and the operation of sending a second MBMS session start message includes sending the second MBMS session start message from the MBMS-GW to one or more MMEs associated with the one or more second eNBs upon receiving the first session start message from the BM-SC.

According to at least one example embodiment, the operations further include, receiving or being configured with, at the MBMS-GW, IP version correspondence information indicating that the first service area corresponds to eNBs having M1 backhaul interfaces of the first IP version and the second service area corresponds to eNBs having M1 backhaul interfaces of the second IP version; and generating, at the MBMS-GW, the first MBMS session start message and the second MBMS session start message by, inserting the first service area identifier, the first IP multicast address, and a first flow ID and a first common tunnel ID identifying a first general packet radio service (GPRS) tunneling protocol (GTP) tunnel into the first MBMS session start message, based on the IP version correspondence information, and inserting the second service area identifier, the second IP multicast address, and a second flow ID and a second common tunnel ID identifying a second general packet radio service (GPRS) tunneling protocol (GTP) tunnel in the second MBMS session start message, based on the IP version correspondence information, the first and second flow IDs being different.

According to at least one example embodiment, the MBMS-GW is programmed such that, the operation of receiving a first session start message includes identifying, at the MBMS-GW, a first flow ID included in the first session start message, the first flow ID being one of a plurality of flow IDs included in a first pool of flow IDs assigned to the BM-SC, the second flow ID being one of a plurality of flow IDs included in a second pool of flow IDs assigned to the MBMS-GW, no flow IDs included in the first pool being included in the second pool, and no flow IDs included in the second pool being included in the first pool.

According to at least one example embodiment, the operations the first MBMS-GW is programmed to execute further include, upon receiving a first session update or stop request from the BM-SC at the MBMS-GW, sending a first MBMS session update or stop request to the one or more MMEs associated with the one or more first eNBs, the first MBMS session update including the first flow ID; and sending a second MBMS session update or stop request to the one or more MMEs associated with the one or more second eNBs, the second MBMS session update including the second flow ID.

According to at least one example embodiment, wherein the operations the network element is programmed to execute further include sending a MBMS session start message, the MBMS session start message including the first IP multicast address, the second IP multicast address, a first common tunnel ID identifying a first general packet radio service (GPRS) tunneling protocol (GTP) tunnel, and a second common tunnel ID identifying a second GTP tunnel.

According to at least one example embodiment, the network element is an MBMS gateway (MBMS-GW), and the operations further include, receiving, at the MBMS-GW, a first session start message, the first session start message being received from a broadband/multicast— service center (BM-SC); and identifying, in the first session start message, at least one of, a first service area to which at least one of the one or more first eNBs and at least one of the one or more second eNBs are assigned, and a plurality of service areas including a service area to which at least one of the one or more first eNBs have been assigned and a service area to which at least one of the one or more second eNBs have been assigned, the one or more first eNBs each having M1 backhaul interfaces for the first internet protocol (IP) version, the one or more second eNBs each having M1 backhaul interfaces for the second IP version.

According to at least one example embodiment, the operation of sending a MBMS session start message includes sending the MBMS session start message from the MBMS-GW to one or more mobility management entities (MMEs) upon receiving the first session start message from the BM-SC, each of the one or more MMEs being associated with at least one eNB from among the one or more first eNBs or at least one eNB from among the one or more second eNBs.

According to at least one example embodiment, the operations the MBMS-GW is programmed to execute further include, receiving or being configured with, at the MBMS-GW, IP version correspondence information indicating which service areas correspond to which M1 backhaul interface IP versions.

BRIEF DESCRIPTION OF THE DRAWINGS

Example embodiments of the present invention will become more fully understood from the detailed description provided below and the accompanying drawings, wherein like elements are represented by like reference numerals, which are given by way of illustration only and thus are not limiting of the present invention and wherein:

FIG. 2 is a diagram illustrating an eMBMS user plane flow according to at least one example embodiment.

FIGS. 8A and 8B are communications flow diagrams illustrating a method of providing eMBMS in a wireless communications network having mixed internet protocols according to at least one example embodiment.

DETAILED DESCRIPTION OF EXAMPLE EMBODIMENTS

Figure 1A:
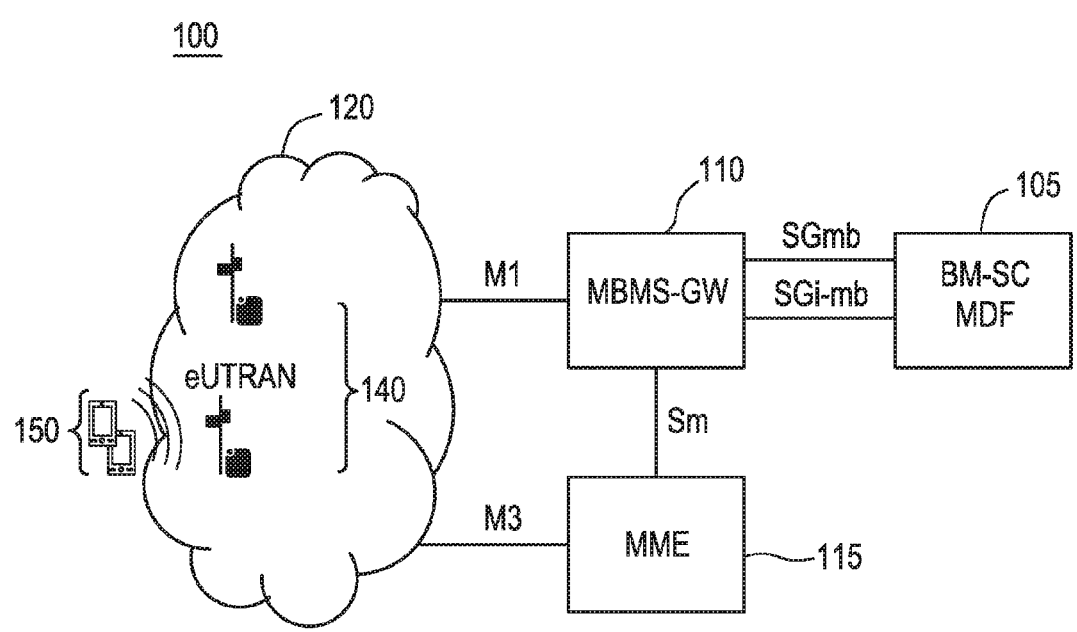
FIG. 1A is a diagram of a wireless communications network that implements enhanced multimedia broadcast multicast services (eMBMS) according to at least one example embodiment.

Various example embodiments of the present invention will now be described more fully with reference to the accompanying drawings in which some example embodiments of the invention are shown.

Detailed illustrative embodiments of the present invention are disclosed herein. However, specific structural and functional details disclosed herein are merely representative for purposes of describing example embodiments of the present invention. This invention may, however, may be embodied in many alternate forms and should not be construed as limited to only the embodiments set forth herein.

Accordingly, while example embodiments of the invention are capable of various modifications and alternative forms, embodiments thereof are shown by way of example in the drawings and will herein be described in detail. It should be understood, however, that there is no intent to limit example embodiments of the invention to the particular forms disclosed, but on the contrary, example embodiments of the invention are to cover all modifications, equivalents, and alternatives falling within the scope of the invention. Like numbers refer to like elements throughout the description of the figures. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

The terminology used herein is for the purpose of describing particular embodiments only and is not intended to be limiting of example embodiments of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

As used herein, the term user equipment (UE) may be considered synonymous to, and may hereafter be occasionally referred to, as a access terminal, terminal, mobile, mobile unit, mobile station, mobile user, subscriber, user, remote station, receiver, etc., and may describe a remote user of wireless resources in a wireless communication network. The term an evolved Node B (eNB) may be considered synonymous to and/or referred to as base station (BS), base transceiver station (BTS), NodeB, access point, etc., and may describe equipment that provides the radio baseband functions for data and/or voice connectivity between a network and one or more users.

Exemplary embodiments are discussed herein as being implemented in a suitable computing environment. Although not required, exemplary embodiments will be described in the general context of computer-executable instructions, such as program modules or functional processes, being executed by one or more computer processors or CPUs. Generally, program modules or functional processes include routines, programs, objects, components, data structures, etc. that performs particular tasks or implement particular abstract data types. The program modules and functional processes discussed herein may be implemented using existing hardware including one or more digital signal processors (DSPs), application-specific-integrated-circuits, field programmable gate arrays (FPGAs) computers or the like.

In the following description, illustrative embodiments will be described with reference to acts and symbolic representations of operations (e.g., in the form of flowcharts) that are performed by one or more processors, unless indicated otherwise. As such, it will be understood that such acts and operations, which are at times referred to as being computer-executed, include the manipulation by the processor of electrical signals representing data in a structured form. This manipulation transforms the data or maintains it at locations in the memory system of the computer, which reconfigures or otherwise alters the operation of the computer in a manner well understood by those skilled in the art.

Overview of Example Network Architecture and Example Network Element Structure

FIG. 1A is a diagram of a wireless communications network 100 that implements enhanced multimedia broadcast multicast services (eMBMS) according to at least one example embodiment. Wireless communications network 100 may implement, for example, the long term evolution (LTE) wireless communications standard.

Referring to FIG. 1A, the wireless communications network 100 may include a broadband/multicast— service center (BM-SC) 105, a Multimedia Broadcast/Multicast Service—gateway (MBMS-GW) 110, a mobility management entity (MME) 115, and an evolved universal mobile telecommunications system (UMTS) radio access network (eUTRAN). The BM-SC 105 and MBMS-GW 110 may be connected to each other via SGmb and SGi-mb interfaces. The MBMS-GW 110 and MME 115 may be connected to each other via a Sm interface, and the MBMS-GW 110 and MME 115 may be connected to the eUTRAN 120 via M1 and M3 interfaces, respectively.

The eUTRAN 120 may include multi-cell/multicast coordination entities (MCEs) and evolved Node Bs (eNBs) 140. Each of the eNBs 140 provides wireless access for user equipment (UEs) attached to the wireless communications network 100 including, for example, UEs 150.

Figure 1B:
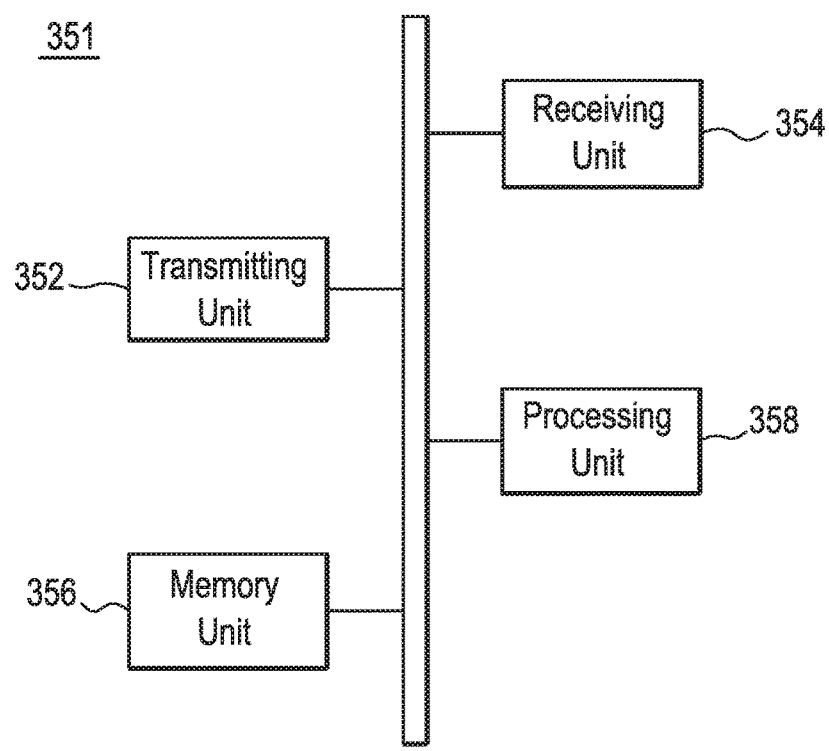
FIG. 1B is a diagram illustrating an example structure of a network element.

FIG. 1B is a diagram illustrating an example structure of the network element 351. Any network element described herein may have the structure and operation of the network element 351 described below. For example, any one of the BM-SC 105, the MBMS-GW 110, the MME 115, and the eNBs 140 may have the structure and operation of the network element 351 described below. Further, the UEs 150 may each have the structure an operation of the network element 351. Referring to FIG. 1B, the network element 351 may include, for example, a data bus 359, a transmitting unit 353, a receiving unit 354, a memory unit 356, and a processing unit 358.

The transmitting unit 353, receiving unit 354, memory unit 356, and processing unit 358 may send data to and/or receive data from one another using the data bus 359.

The transmitting unit 353 is a device that includes hardware and any necessary software for transmitting signals including, for example, control signals or data signals via one or more wired and/or wireless connections to other network element.

The receiving unit 354 is a device that includes hardware and any necessary software for receiving wireless signals including, for example, control signals or data signals via one or more wired and/or wireless connections to other network elements.

The memory unit 356 may be any device capable of storing data including magnetic storage, flash storage, etc.

The processing unit 358 may be any device capable of processing data including, for example, a processor structurally configured to carry out specific operations, or structurally configured to execute instructions included in computer readable code including, for example, code stored in the memory unit 356. Examples of the above-referenced processor include, but are not limited to, a microprocessor, a multiprocessor, a central processing unit (CPU), a digital signal processor (DSP), an application-specific integrated circuit (ASIC), and a field programmable gate array (FPGA).

According to at least one example embodiment, any operations described herein, for example with reference to any of FIGS. 1-8B, as being performed by a network element (including, for example, any of the BM-SC 105, the MBMS-GW 110, the MME 115, and the eNBs 140), may be performed by a network element having the structure of the network element 351 illustrated in FIG. 1B. For example, according to at least one example embodiment, the network element 351 may be programmed, in terms of software and/or hardware, to perform any or all of the functions described herein as being performed by a network element.

Examples of the network element 351 being programmed, in terms of software, to perform any or all of the functions described herein as being performed by a network element will now be discussed below. For example, the memory unit 356 may store a program including executable instructions corresponding to any or all of the operations described with reference to FIGS. 1-8B as being performed by a network element. According to at least one example embodiment, additionally or alternatively to being stored in the memory unit 356, the executable instructions may be stored in a computer-readable medium including, for example, an optical disc, flash drive, SD card, etc., and the network element 351 may include hardware for reading data stored on the computer readable-medium. Further, the processing unit 358 may be a processor configured to perform any or all of the operations described with reference to FIGS. 1-8B as being performed by a network element, for example, by reading and executing the executable instructions stored in at least one of the memory unit 356 and a computer readable storage medium loaded into hardware included in the network element 351 for reading computer-readable mediums.

Examples of the network element 351 being programmed, in terms of hardware, to perform any or all of the functions described herein as being performed by a network element will now be discussed below. Additionally or alternatively to executable instructions corresponding to the functions described with reference to FIGS. 1-8B as being performed by a network element being stored in a memory unit or a computer-readable medium as is discussed above, the processing unit 358 may include a circuit that has a structural design dedicated to performing any or all of the operations described with reference to FIGS. 1-8B as being performed by a network element. For example, the above-referenced circuit included in the processing unit 358 may be a FPGA or ASIC physically programmed to perform any or all of the operations described with reference to FIGS. 1-8B as being performed by a network element.

Issues with MBMS in Mixed Protocol Networks

Network operators providing Multimedia Broadcast/Multicast Service (MBMS) over LTE networks may need to broadcast services via networks that have a mix of internet protocol version 4 (IPv4) and internet protocol version 6 (IPv6) backhaul. In an environment where there are one or more Multicast-broadcast single-frequency networks (MBSFNs) with a mix of eNBs with IPv4 backhaul interfaces and eNBs with IPv6 backhaul interfaces, the MBMS-GW 3GPP M1 interfaces may require a dual internet protocol (IP) stack. For example, it may be necessary to create different MBMS sessions for the two sets of eNBs (i.e., ipv4 eNBs and ipv6 eNBs), while maintaining synchronization of content transmitted on the Long Term Evolution (LTE) air interface for those two sessions to satisfy the 3GPP MBSFN requirements provided, for example in 3GPP TS 23.246, 3GPP TS 36.300, or 3GPP TS 36.440, the entire contents of each of which are incorporated herein by reference.

According to at least one example embodiment, MCEs are co-located with eNBs. Consequently, operations described herein as being performed by or on an MCE may be performed by or on an eNB co-located with the MCE, or a physical network node in which the eNB and MCE are embodied. Further, signaling described herein as taking place between an eNB and a corresponding MCE may take place inside a physical network element embodying the eNB and MCE, for example, between a logical node representing the eNB and a logical node representing the MCE. Additionally, though, for the purpose of simplicity, MCEs are, at times, described herein with reference to an example where MCEs are co-located with eNBs, according to at least one example embodiment, MCEs may be implemented by a network element that is not co-located with an eNB.

One solution for providing MBMS in a communication network having mixed internet protocols would be to partition eNBs that transmit MBMS services into geographical service areas. For example, referring to wireless communications network 100, when configuring an MBMS service, the network operator of wireless communications network 100 could specify which service area(s) the MBMS service is to be broadcast in. However, in accordance with the existing 3GPP specifications, it may be necessary to create separate MBMS sessions in the BM-SC 105 for the IPv4 and IPv6 service areas. Consequently, it may be necessary for the BM-SC 105 to synchronize the bearer transmission for the two MBMS sessions (i.e., an IPv4 session and an IPv6 session) and send two separate bearer streams on the SGi-mb interface to the MBMS-GW 110 in order to provide MBMS services for an MBSFN including a mix of IPv4 and IPv6 eNBs. This would create twice as much traffic on the SGi-mb interface in comparison with a scenario where MBMS is implemented for network having only IPv4 eNBs or only IPv6 eNBs.

Accordingly, it would be desirable to implement MBMS for an MBSFN having IPv4 eNBs and IPv6 eNBs without requiring the duplication of content sent from the BM-SC 105 via the SGi-mb interface. Thus, according to at least one example embodiment, a single stream sent from the BM-SC 105 may be split at another network element including, for example, the MBMS-GW 110, into an IPv4 stream and an IPv6 stream thus reducing or, alternatively, eliminating the need to send duplicate streams over the SGi-mb interface. Further, according to at least one example embodiment, synchronization may be maintained across the IPv4 and IPv6 streams.

For example, FIG. 2 is a diagram illustrating an eMBMS user plane flow according to at least one example embodiment. Referring to FIG. 2, according to at least one example embodiment, the first protocol stack 210, may be identical with the second and third protocol stacks 220 and 230 up to the synchronization protocol (SYNC) layer, where the first protocol stack 210 is the protocol stack of an initial content stream sent from the media delivery function (MDF) included in the BM-SC 105 to the MBMS-GW 110 via the SGi-mb interface, and the second and third protocol stacks 220 and 230 are protocol stacks of the IPv4 and IPv6 content streams, respectively, into which the MBMS-GW 110 splits the initial content stream sent by the MDF of the BM-SC 105 before sending the split streams to the eUTRAN 120 via the M1 interface.

For example, as is illustrated in FIG. 2, the first 4 protocol layers, including the file delivery of unidirectional transport protocol (FLUTE) layer, user datagram protocol (UDP) layer, IPv6 layer and SYNC layer, may be the same for each of first through third protocol stacks 210~230. Further, the second stack 220 may differ from the first stack 210 in that, after the SYNC layer, the second stack 220 may include a general packet radio service (GPRS) tunneling protocol (GTP) layer, a UDP layer and an IPv4 layer. Further, the third stack 230 may differ from the first stack 210 in that, after the SYNC layer, the third stack 220 may include a GTP layer in addition to a UDP layer and an IPv6 layer. By maintaining the same protocol layer up to and including the SYNC layer, the IPv4 and IPv6 content streams generated by the MBMS-GW may remain synchronized with each other and the initial content stream sent by the BM-SC 105.

However, in addition to creating two synchronized streams including an IPv4 stream and an IPv6 stream, the wireless communications network must ensure that the IPv4 and IPv6 streams are properly provided to the IPv4 and IPv6 eNBs, respectively. Two example methods for ensuring the proper delivery of the IPv4 and IPv6 streams will now be discussed in greater detail below.

According to at least one example embodiment, the first example method includes using service areas partitioned according to the Internet protocol version supported by the eNBs and will be explained with reference to FIGS. 3-5. According to at least one example embodiment, the second example method which does not require partitioned service area will be explained with reference to FIGS. 6-8B.

Example Method for Providing MBMS in a Mixed Protocol Network Using Service Area Partitioning According to at least one example embodiment, with the first example method for providing MBMS in a mixed protocol network, the network operator defines two service areas, or two sets of service areas, and assigns the service areas to the eNBs in an MBSFN based on the protocol types of the eNBs. For example, one service area may be assigned only to eNBs with IPv6 backhaul interfaces, and another service area may be assigned only to eNBs with IPv4 backhaul interfaces.

Further, according to at least one example embodiment, the MBMS-GW 110 is configured such that the MBMS-GW 110 can determine which service area IDs (SAIs) pertain to service areas with IPv4 backhaul and which SAIs pertain to service areas with IPv6 backhaul.

Figure 3:
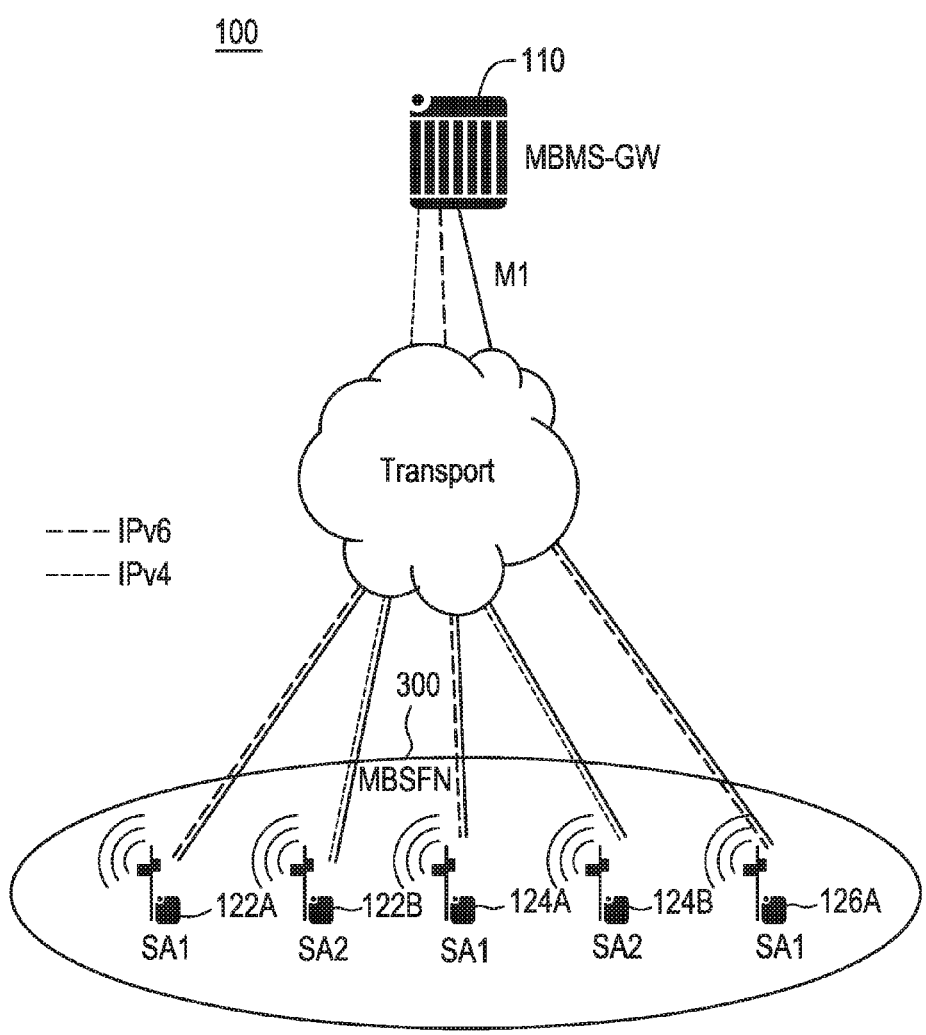
FIG. 3 is a diagram for illustrating service area partitioning in a multicast-broadcast single-frequency network (MB-SFN) according to at least one example embodiment.
Figure 4:
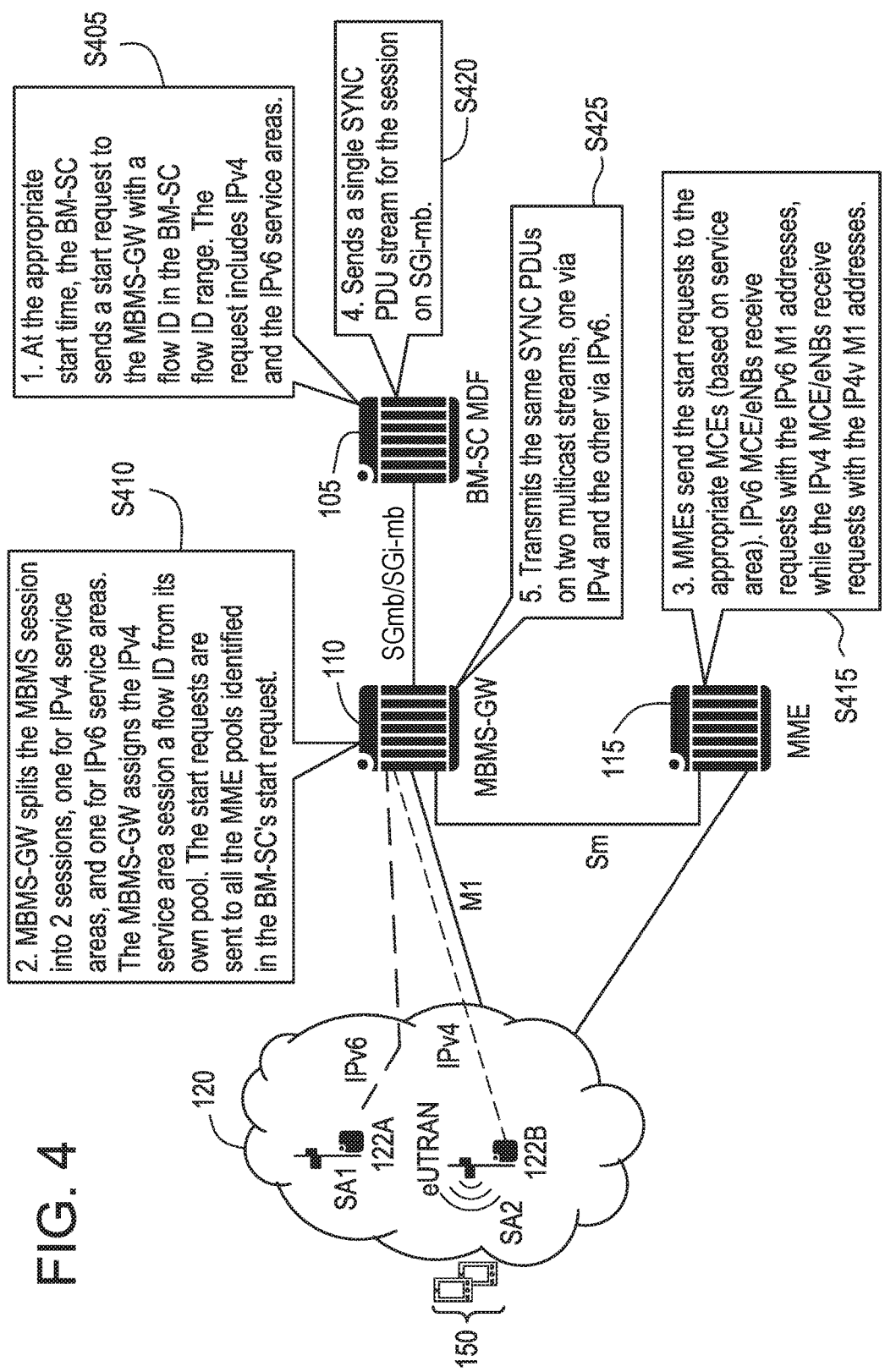
FIG. 4 is a diagram illustrating a method of providing eMBMS in a wireless communications network having mixed internet protocols according to at least one example embodiment.

FIG. 3 is a diagram for illustrating service area partitioning in a multicast-broadcast single-frequency network (MBSFN) 300 according to at least one example embodiment. FIG. 4 is a diagram illustrating a method of providing eMBMS in a wireless communications network having mixed internet protocols according to at least one example embodiment. FIG. 5 is a communications flow diagram illustrating a method of providing eMBMS in a wireless communications network having mixed internet protocols according to at least one example embodiment.

FIG. 3 illustrates a portion of the wireless communications network 100 illustrated in FIG. 1A. Referring to FIG. 3, the eNBs 140 included in the wireless communications network 100 may include first, second and third IPv6 eNBs 122A, 124A and 126A. Further, the eNBs 140 may also include first and second IPv4 eNBs 122B and 124B. First through third IPv6 eNBs 122A-126A are configured to use the IPv6 protocol. For example, first through third IPv6 eNBs 122A-126A are configured to use IPv6 format addresses. First and second IPv4 eNBs 122B and 124B are configured to use the IPv4 protocol. For example, First and second IPv4 eNBs 122B and 124B are configured to use IPv4 format addresses.

Additionally, in the example illustrated in FIG. 3, the first through third IPv6 eNBs 122A~126A and the first and second IPv4 eNBs 122B and 124B are all included in the same MBSFN, MBSFN 300. As will be discussed in greater detail below with reference to FIGS. 4 and 5, in order to ensure that MBMS content is properly delivered in a synchronized manner to both the IPv6 and IPv4 eNBs of the MBSFN 300, the IPv6 and IPv4 eNBs of the MBSFN 300 are assigned the first and second service areas SA1 and SA2, respectively, as is illustrated in FIG. 3.

An example method of providing MBMS service in a network with mixed protocols will now be discussed with reference to FIGS. 4 and 5. Referring to FIG. 4, in step S405, the BM-SC 105 sends a start request to the MBMS-GW 110, and the MBMS-GW 110 receives the start request. The start request includes a flow ID in the flow ID range of the BM-SC 105 as well as IPv4 and IPv6 SAIs.

Figure 5:
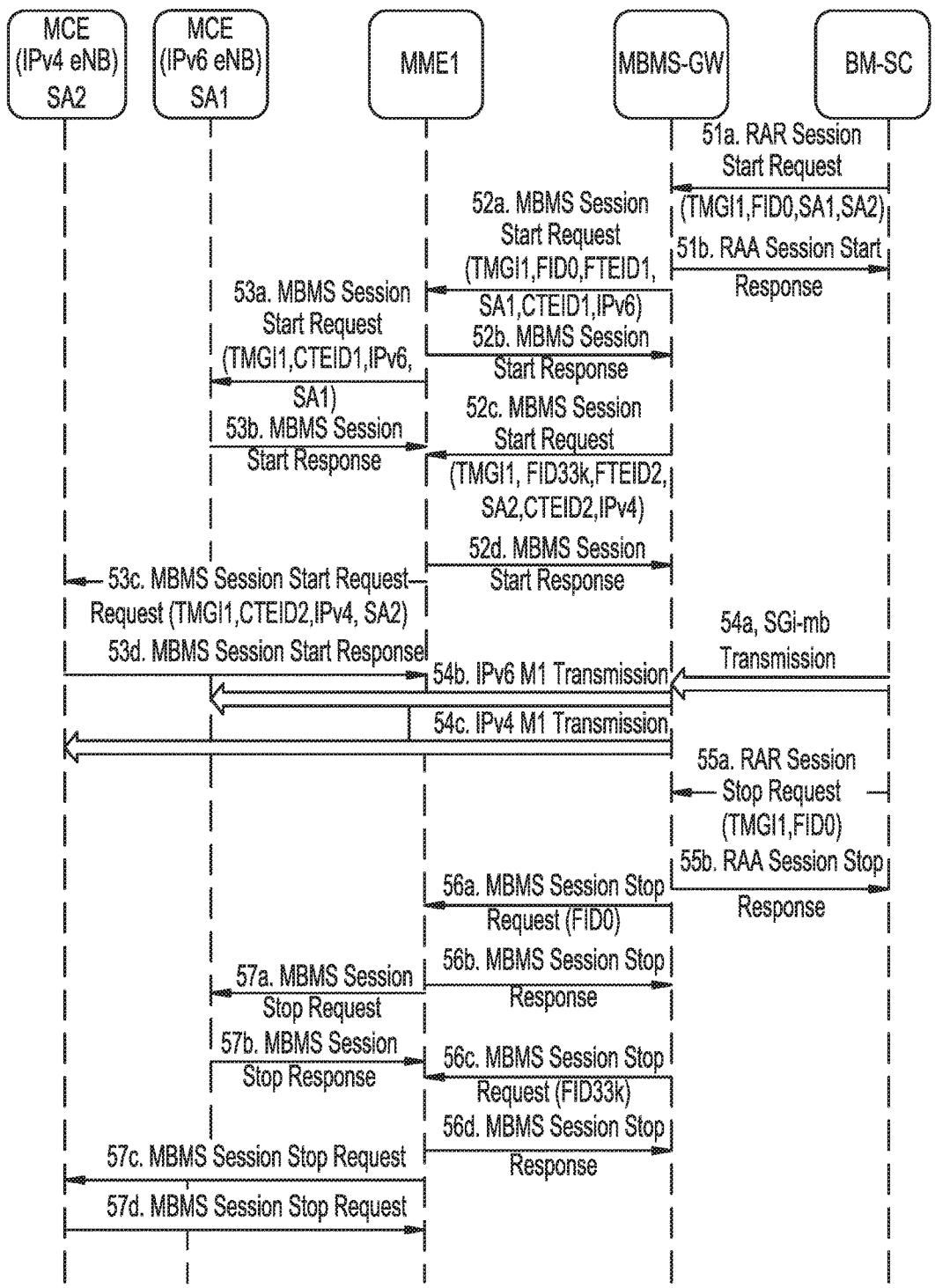
FIG. 5 is a communications flow diagram illustrating a method of providing eMBMS in a wireless communications network having mixed internet protocols according to at least one example embodiment.

For example, steps 51*a* and 51*b* in FIG. 5 explain an example of step S405 in additional detail. Referring FIG. 5, in step 51*a*, the BM-SC 105 sends a re-auth-request (RAR) session start request to the MBMS-GW 110. The BM-SC 105 may transmit the RAR Session Start Request on the SGmb interface as defined in 3GPP TS 29.061. According to at least one example embodiment, the RAR session start request sent by the BM-SC 105 and received by the MBMS-GW 110 in step S405 may include:

a temporary mobile group identity (TMGI);
a MBMS-Flow-Identifier attribute-value pair (AVP) with a unique flow ID (e.g. 0) for this TMGI;

a MBMS-Service-Area AVP containing the IPv4 and IPv6 SAIs (e.g. SA1 and SA2);

a 3GPP-SGSN-Address AVP that provides a list of IPv4 addresses for the MMEs that the BM-SC selects for this session; and a 3GPP-SGSN-IPv6-Address AVP that provides a list of IPv6 addresses for the MMEs that the BM-SC selects for this session.

For example, according to at least one example embodiment, the BM-SC 105 and MBMS-GW 110 are configured with non-overlapping pools of flow IDs. Further, as will be discussed in greater detail below, the flow IDs are used to allow the MME 115 to distinguish MBMS Sessions that overlap in time and have a common TMGI, but do not overlap in terms of service area. In the example illustrated in FIG. 5, the RAR session start request sent in step 51*a* includes a first TMGI value TMGI1, a first flow ID, FID0, and indicators for the first and second service areas SA1 and SA2. As will be discussed in greater detail below with reference to step 54*a*, according to at least one example embodiment, because the BM-SC 105 has only one session context for the current session corresponding to the session start request sent in step 51*a*, the BM-SC 105 will send a single user-plane stream on the SGi-mb interface to the MBMS-GW 110 for the MBMS session established via step 51*a*.

Returning to FIG. 5, upon receiving the RAR session start request sent in step 51*a*, the MBMS-GW 110 responds with a positive re-auth-answer (RAA) session start response in step 51*b*.

Returning to FIG. 4, in step S410 the MBMS-GW 110 splits the MBMS session corresponding to the RAR session start request received in step S405 into two MBMS sessions corresponding to the IPv6 service area SA1 and the IPv4 service area SA2, respectively. For example, the MBMS-GW 110 may create two session contexts corresponding, respectively, to the IPv6 and IPv4 service areas SA1 and SA2. Further, the MBMS-GW 110 may assign the IPv4 service area SA2 with a flow ID from the flow ID pool of the MBMS-GW 110 while maintaining the flow ID originally set by the BM-SC 105 for the IPv6 service area SA1. The MBMS-GW 110 then sends an MBMS session start request for the IPv6 session and an MBMS session start request for the IPv4 session to the MME 115 via the Sm interface. As is described above, the MBMS-GW 110 may be configured to determine which service areas are IPv4 service areas and which service areas are IPv6 service areas based on the SAIs of the service area. Further, according to at least one example embodiment, an operator of the MBMS-GW 110 or the wireless communications network 110 can provide the MBMS-GW 110 with, for example, IP correspondence information defining the IP version associated with each of a plurality of SAIs. Accordingly, based on the IP correspondence information and the SAIs the MBMS-GW 110 can assign different flow IDs to service areas of different IP versions, respectively, such that service areas having a first IP version (e.g. IPv6) have a first flow ID and service areas having a second IP version (e.g., IPv4) have a second flow ID that is different from the first. For example, the MBMS-GW 110 can assign flow IDs from its own pool of flow IDs specifically to service areas that are IPv4 service area while allowing flow IDs from the non-overlapping pool of flow IDs of the BM-SC-105 to be assigned to service areas that are IPv6 service areas.

For example, steps 52*a*-52*d* in FIG. 5 explain an example of step S410 in additional detail. Referring to FIG. 5, in step 52*a*, the MBMS-GW 110 sends, for example in accordance with 3GPP TS 29.274, the MBMS session start request to the MME 115 for the IPv6 service area. The MBMS-GW 110 may form the MBMS session start request for the IPv6 service area to include both the TMGI and the flow ID originally included in the RAR session start request sent by the BM-SC 105 in step 51*a*, TMGI1 and FID0. Further, the MBMS session start request generated by the MBMS-GW 110 in step 52*a* may also include a service area indicator indicating the IPv6 service area SA1, a unique common tunnel endpoint ID (CTEID), first CTEID CTEID1, a Sm interface MBMS IP multicast distribution information element (IE) identifying the M1 IPv6 multicast destination and source addresses, and a fully qualified tunnel endpoint ID (FTEID), first FTEID FTEID1. According to at least one example embodiment, in step 52*a* the MBMS-GW 110 uses the Sm interface to send the MBMS Session Start Request for the IPv6 service area to the MMEs identified in the 3GPP-SGSN-Address and 3GPP-SGSN-IPv6-Address AVPs included in the session start request received by the MBMS-GW 110 in step 52*a*.

In response to receiving the MBMS session start request for the IPv6 service area, in step 52*b* the MME 115 sends an MBMS session start response to the MBMS-GW 110, for example in accordance with 3GPP TS 29.274, and the MBMS-GW 110 receives the MBMS session start response.

In step 52*c*, the MBMS-GW 110 sends the MBMS session start request for the IPv4 service area to the MME 115, for example in accordance with 3GPP TS 29.274. The MBMS-GW 110 may form the MBMS session start request for the IPv4 service area to include the TMGI in the RAR session start request sent by the BM-SC 110 in step 51*a*, first TMGI TMGI1, and the flow ID assigned from the MBMS-GW 110 pool of flow IDs, second flow ID FID33*k*. Further, the MBMS session start request generated by the MBMS-GW in step 52*c* may also include a service area indicator indicating the IPv4 service area SA2, a unique common tunnel endpoint ID (CTEID), second CTEID CTEID2, a Sm interface MBMS IP multicast distribution IE identifying the M1 IPv4 multicast destination and source addresses, and a second FTEID FTEID2. According to at least one example embodiment, the first and second CTEIDs CTEID1 and CTEID2 are different. According to at least one example embodiment, in step 52*c* the MBMS-GW 110 uses the Sm interface to send the MBMS Session Start Request for the IPv4 service area to the MMEs identified in the 3GPP-SGSN-Address and 3GPP-SGSN-IPv6-Address AVPs included in the session start request received by the MBMS-GW 110 in step 52*a*.

In response to receiving the MBMS session start request for the IPv4 service area, in step 52*d* the MME 115 sends an MBMS session start response to the MBMS-GW 110, for example in accordance with 3GPP TS 29.274, and the MBMS-GW 110 receives the MBMS session start response.

Returning to FIG. 4, in step S415 the MME 115 sends start requests to MCEs included in the service areas indicated by the MBMS session start requests sent from the MBMS-GW 110 to the MME 115 in step S410. For example, the MME may send the start requests to the corresponding MCEs using the M3 interface. Further, in step S420, the MCEs forward the start requests to corresponding eNBs, using the M2 interface.

For example, steps 53*a*-53*d* in FIG. 5 explain an example of step S415 in additional detail. Referring to FIG. 5, in step 53*a*, the MME 115 uses the M3 interface to send an MBMS session start request to MCEs interfacing with eNBs assigned to IPv6 service area SA1. The MBMS session start request sent by the MME 115 for the IPv6 service area SA1 may include the values TMGI1 and CTEID1, the IPv6 M1 address, and the indicator for IPv6 service area SA1 from the MBMS session start request received at the MME 115 for the IPv6 service area SA1 in step 52a. For example, according to at least one example embodiment, the MME 115 includes the M1 IPv6 multicast destination address and source address along with CTEID1 in M3 interface transport network layer (TNL) information in the MBMS Start Request sent in step 53a. For example, in step 53a, the MME 115 sends the MBMS session start message for the IPv6 service area SA1 to the MCE(s) that interface with the first through third IPv6 eNBs 122A~126A. Additionally, though not illustrated in FIG. 5, according to at least one example embodiment, in step 53a the MCE(s) use, for example, the M2 interface to send a start request with the M1 IPv6 multicast destination address and source address along with the first CTEID CTEID1 in M2 interface transport network layer (TNL) information to the eNBs assigned to SA1.

In step 53b, the MCEs that received the start request in step 53a send MBMS session start responses to the MME 115 in response to the MBMS session start requests sent by the MME for the IPv6 service area in step 53a.

In step 53c, the MME 115 sends an MBMS session start request for the IPv4 service area SA2 to MCEs interfacing with eNBs assigned to IPv4 service area SA2. The MBMS session start request sent by the MME 115 for the IPv4 service area SA2 may include the values TMGI1 and CTEID2, the IPv4 M1 address, and the indicator for IPv4 service area SA2 from the MBMS session start request received at the MME 115 for the IPv4 service area in step 52c. For example, according to at least one example embodiment, the MME 115 includes the M1 IPv4 multicast destination address and source address along with CTEID2 in M3 interface TNL information in the MBMS Start Request sent in step 53c. For example, in step 53c, the MME 115 sends the MBMS session start message for the IPv4 service area SA2 to the MCE(s) that interface with the first and second IPv4 eNBs 122B and 124B. Additionally, though not illustrated in FIG. 5, according to at least one example embodiment, in step 53c the MCE(s) use, for example, the M2 interface to send a start request start request with the M1 IPv4 multicast destination address and source address along with the second CTEID CTEID2 in M2 interface transport network layer (TNL) information to the eNBs assigned to SA2.

In step 53d, the MCEs that received the start request in step 53c send MBMS session start responses to the MME 115 in response to the MBMS session start requests sent by the MME for the IPv4 service area in step 53c.

Returning to FIG. 4, in step S420, the BM-SC 105 sends a single MBMS content stream to the MBMS-GW 110, and the MBMS-GW 110 receives the stream. For example, as is shown in step 54a in FIG. 5, which corresponds to step S420, the BM-SC 105 may initiate a user plane data flow on the SGi-mb interface by sending a single SYNC protocol data unit (PDU) stream (e.g., a single IPv6 unicast stream) to the MBMS-GW 110 using the SGi-mb interface, and the MBMS-GW 110 receives the stream.

Returning to FIG. 4, in step S425, the MBMS-GW 110 sends two MBMS content streams via IPv6 and IPv4, respectively. The two MBMS content streams correspond to the content stream received by the MBMS-GW 110 from the MB-SC 105 in step S420. For example, as is shown in steps 54b and 54c in FIG. 5, which correspond to step S425, the MBMS-GW 110 may use the M1 interface to transmit an IPv6 multicast stream and an IPv4 multicast stream both having the same SYNC PDU and content included in the IPv6 stream sent to the MBMS-GW 110 in step 54a. For example, in step 54b, the MBMS-GW 110 may transmit the IPv6 multicast stream in a GTP tunnel with the first CTEID CTEID1 using, for example, the IPv6 M1 destination and source addresses identified in the MBMS session start request sent by the MBMS-GW 110 in step 52a; and, in step 54c, the MBMS-GW 110 may transmit the IPv4 multicast stream in a GTP tunnel with the second CTEID CTEID2 using, for example, the IPv4 M1 destination and source addresses identified in the MBMS session start request sent by the MBMS-GW 110 in step 52c.

According to at least one example embodiment, steps 54b and 54c may be executed at the same time such that the MBMS-GW 110 sends the IPv6 multicast stream and the IPv4 multicast stream simultaneously. According to at least one example embodiment, the IPv6 multicast stream and the IPv4 multicast stream sent by the MBMS-GW 110 in steps 54b and 54c are synchronized with each other.

For example, the user plane flow for steps 54a-c in the first example method for providing MBMS in a mixed protocol network may be the same as that described above with reference to FIG. 2.

Steps 55a-57c illustrate an example process for stopping an MBMS session. According to at least one example embodiment, the MBMS session is stopped in accordance with 3GPP TS 29.274. For example, when the session initiated in step 51a expires, the BM-SC 105 uses, for example, the SGmb interface to send an RAR session stop request including the first TMGI TMGI1 and the first flow ID FID0 to the MBMS-GW 110 in step 55a. Next, the MBMS-GW 110 responds by sending a RAA session stop response in step 55b. Next, the MBMS-GW 110 sends a first MBMS session stop request including the first flow ID FID0 to the MME 115 in step 56a using, for example, the Sm interface. In response to the first MBMS session stop request, the MME 115 sends a MBMS session stop response to the MBMS-GW 110 in step 56b. Further, the MBMS-GW 110 sends a second MBMS session stop request including the second flow ID FID33k to the MME 115 in step 56c using, for example, the Sm interface. In response to the second MBMS session stop request, the MME 115 sends a MBMS session stop response to the MBMS-GW 110 in step 56d.

Next, in steps 57a and 57c, the MME 115 sends MBMS session stop requests to the MCEs interfacing with eNBs assigned to the IPv6 service area SA1 and MCEs interfacing with eNBs assigned to the IPv4 service area SA2, respectively, using, for example, the M3 interface. The MME 115 receives MBMS session stop responses from the MCEs interfacing with eNBs assigned to the IPv6 service area SA1 in step 57b. Further, the MME 115 receives MBMS session stop responses from the MCEs interfacing with eNBs assigned to the IPv4 service area SA2 in step 57d.

A second example method for providing MBMS in a mixed protocol network which does not require service area partitioning according to IP protocol type will now be discussed with reference to FIGS. 6-8B below.

Example Method for Providing MBMS in a Mixed Protocol Network without Service Area Partitioning In the first example method of providing MBMS in a mixed protocol network explained above with reference to FIGS. 3-5, MCEs using interfaces for different IP backhauls (e.g., IPv4 and IPv6) were assigned to different service areas. With respect to the second example method for providing MBMS in a mixed protocol network, a network operator can either define two service areas, or two sets of service areas for eNBs with IPv4 and IPv6 backhaul interfaces, as in the first example described above, or define a single service area, or a single set of service areas for both IPv4 and IPv6 backhaul interfaces. For example, FIGS. 6-8b will be described below with reference to an example whereby a single service area has a mix of IPv4 and IPv6 backhaul.

According to at least one example embodiment, the MBMS-GW 110 can be optionally configured such that the MBMS-GW-110 can determine which service area IDs pertain to service areas with IPv4 backhaul, or IPv6 backhaul or both IPv4 and IPv6 backhaul. According to at least one example embodiment, with the second example method for providing MBMS in a mixed protocol network, if the MBMS-GW 110 is not aware of the IP types of the MCEs that fall into different service areas, the MBMS-GW 110 can assume the service areas have both IPv4 and IPv6 backhaul.

Further, as will be discussed in greater detail below with reference to FIGS. 6-8b, with the second example method for providing MBMS in a mixed protocol network, when the MBMS-GW 110 receives a start request for an MBMS service that needs to be broadcast in IPv4 and IPv6 service areas (i.e. a service area with IPv4 backhaul and another service area with IPv6 backhaul, or service area with IPv4 and IPv6 backhaul), the MBMS-GW 110 creates a single MBMS session context. This session context is assigned the TMGI and flow ID provided by the BM-SC 105 in the RAR Session Start Request that prompts the MBMS-GW 110 to create the MBMS session, for example in accordance with 3GPP TS 29.061. In the Session Start Request sent to the MME for this MBMS session context, the MBMS-GW includes two instances of the MBMS IP Multicast Distribution information element (IE), one instance that contains the M1 IPv4 addresses, and another instance that contains the M1 IPv6 addresses. Further, the two instances may also include CTEIDs that are unique with respect to one another. On the M3 interface, the MME forwards both sets of IP addresses and CTEIDs in the TNL information in the corresponding MBMS Session Start Requests that are sent to the MCE(s). Likewise, on the M2 interface, the MCE(s) send the appropriate MBMS Session Start Requests to the eNBs with both sets of IP addresses and CTEIDs in the TNL information. For the session, the eNB chooses the appropriate M1 address that corresponds to its IP backhaul version and ensures that it has joined the multicast group as per the 3GPP MBMS specifications.

As is discussed below, like the first example method for providing MBMS in a mixed protocol network, the user plane flow for the second example method for providing MBMS in a mixed protocol network may be the same as that described above with reference to FIG. 2.

The second example method for providing MBMS in a mixed protocol network will now be discussed in greater detail below with reference to FIGS. 6-8b.

Figure 6:
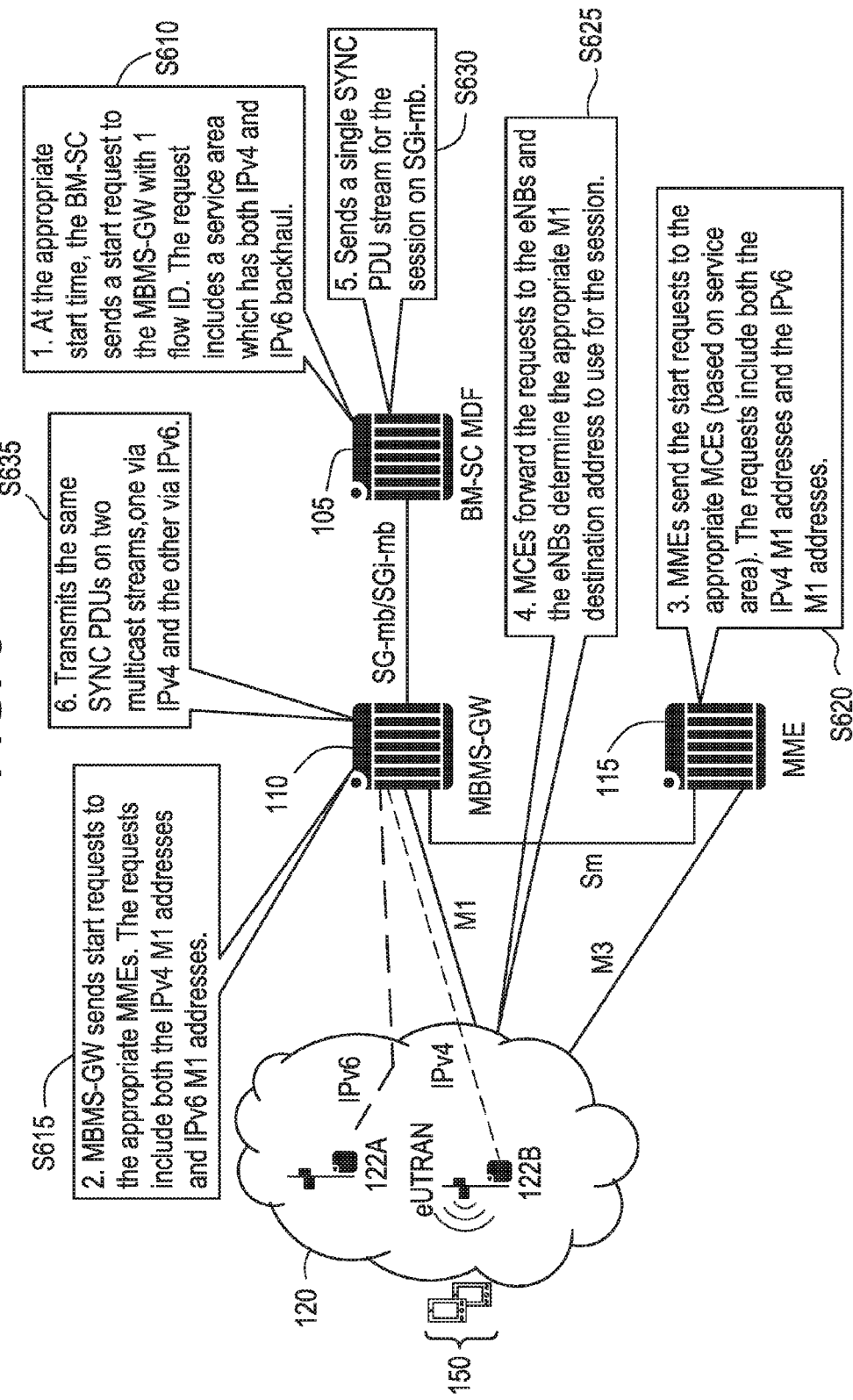
FIG. 6 is a diagram illustrating a method of providing eMBMS in a wireless communications network having mixed internet protocols according to at least one example embodiment.
Figure 7:
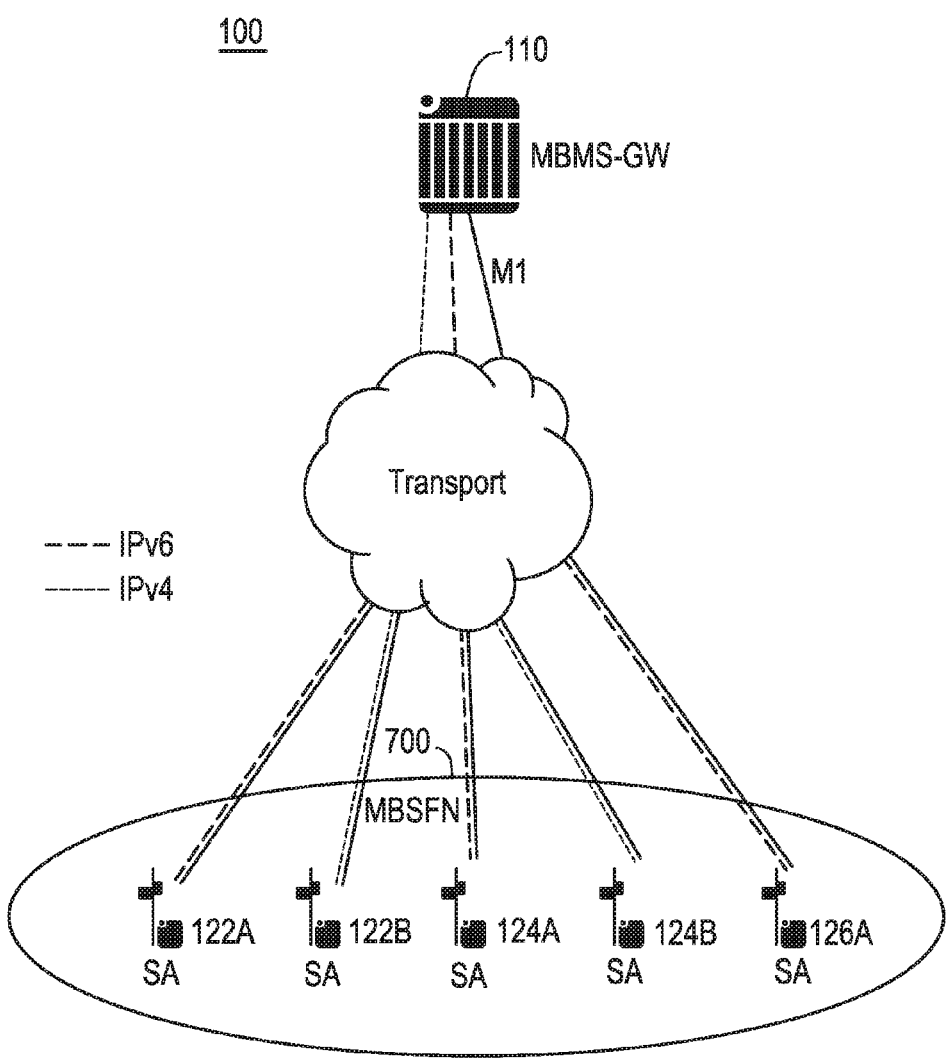
FIG. 7 is a diagram for illustrating service area organization in a MBSFN according to at least one example embodiment.
Figure 8A:
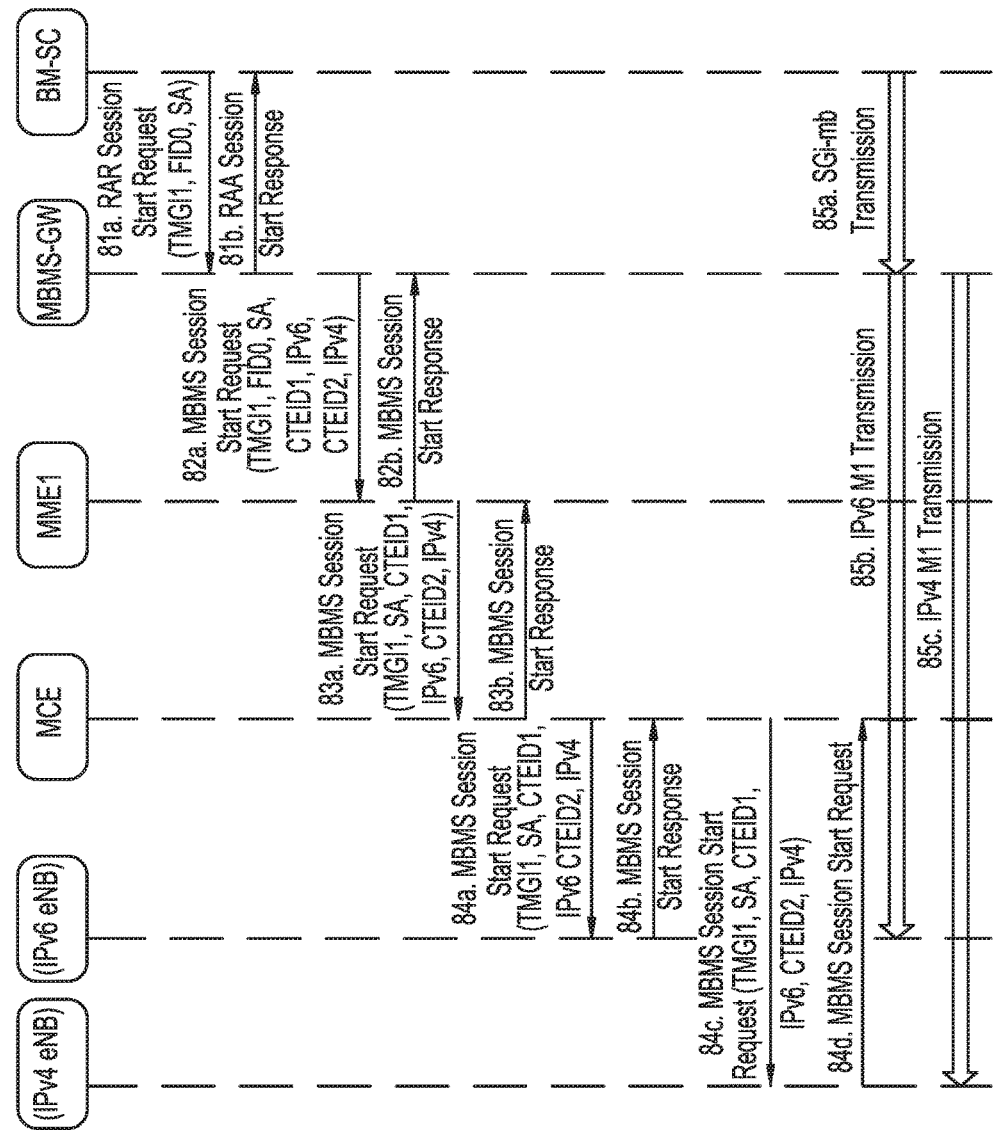

FIG. 6 is a diagram illustrating a method of providing eMBMS in a wireless communications network having mixed internet protocols according to at least one example embodiment. FIG. 7 is a diagram for illustrating service area organization in a MBSFN 700 according to at least one example embodiment. FIGS. 8A and 8B are communications flow diagrams illustrating a method of providing eMBMS in a wireless communications network having mixed internet protocols according to at least one example embodiment.

Referring to FIG. 6, in step S610, the BM-SC 105 sends a start request to the MBMS-GW 110 including a first flow ID FID0, and the MBMS-GW 110 receives the start request. Further, the start request sent in step S610 may identify a service area that includes both IPv4 and IPv6 eNBs. For example, referring to FIG. 7, like the MBSFN 300 of FIG. 3, the MBSFN 700 of FIG. 7 includes first through third IPv6 eNBs 122A-126A, and first and second IPv4 eNBs 122B and 124B. However, unlike the MBSFN 300, in the MBSFN 700 the IPv4 and IPv6 eNBs are not partitioned into service areas in accordance with IP protocol type. Instead the IPv4 and IPv6 eNBs of MBSFN 700 are all part of the same service area (SA).

Steps 81a and 81b in FIG. 8 explain an example of step S610 in additional detail. Referring FIG. 8A, in step 81a, the BM-SC 105 sends a RAR session start request to the MBMS-GW 110. The BM-SC 105 may transmit the RAR Session Start Request on the SGmb interface as defined in 3GPP TS 29.061. According to at least one example embodiment, the RAR session start request sent by the BM-SC 105 and received by the MBMS-GW 110 in step S610 may include:

a TMGI;

a MBMS-Flow-Identifier attribute-value pair (AVP) with a unique flow ID (e.g. 0) for this TMGI;

a MBMS-Service-Area AVP containing the IPv4 and IPv6 service area ID(s) (e.g. SA);

a 3GPP-SGSN-Address AVP that provides a list of IPv4 addresses for the MMEs that the BM-SC 105 selects for this session; and a 3GPP-SGSN-IPv6-Address AVP that provides a list of IPv6 addresses for the MMEs that the BM-SC 105 selects for this session.

Upon receiving the RAR session start request sent in step 81a, the MBMS-GW 110 responds with a positive RAA session start response in step 81b.

In step S615, the MBMS-GW 110 sends start requests to one or more MMEs. Each start request may include both IPv4 addresses and IPv6 addresses. For example, steps 82a and 82b in FIG. 8 explain an example of step S615 in additional detail. Referring to FIG. 8, in step 82a the MBMS-GW 110 sends a dual-protocol MBMS session start request to the MME 115 using the Sm interface. The MBMS-GW 110 may form the dual-protocol MBMS session start request to include both the TMGI and the flow ID originally included in the RAR session start request sent by the BM-SC 110 in step 81a, TMGI1 and FID0. Further, the dual-protocol MBMS session start request generated by the MBMS-GW 110 in step 82a may also include a service area indicator indicating the mixed protocol service area SA, a first Sm interface MBMS IP multicast distribution IE identifying M1 IPv6 multicast destination and source addresses, a first CTEID CTEID1 corresponding to the first distribution IE, a second Sm interface MBMS IP multicast distribution IE identifying M1 IPv4 multicast destination and source addresses, and a second CTEID CTEID2 corresponding to the second distribution IE. According to at least one example embodiment, in step 82a the MBMS-GW 110 sends the dual-protocol MBMS Session Start Request to the MMEs identified in the 3GPP-SGSN-Address and 3GPP-SGSN-IPv6-Address AVPs included in the session start request received by the MBMS-GW 110 in step 82a, using the Sm interface.

Thus, according to at least one example embodiment, with the second example method for providing MBMS in mixed protocol networks, the Sm interface may be augmented to accept, in a single dual-protocol MBMS session start request, two different distribution IEs corresponding, respectively, two IPv6 and IPv4 addresses, as well as two different CTEIDs also corresponding, respectively, to the IPv6 and IPv4 addresses.

In response to receiving the dual-protocol MBMS session start request, the MME 115 sends an MBMS session start response to the MBMS-GW 110 and the MBMS-GW 110 receives the MBMS session start response in step 82*b*.

Returning to FIG. 4, in step S620, the MME 115 sends start requests to MCEs in the eUTRAN 120 according to the service area or service areas specified in the start request received at the MME 115 in step S615. The start requests sent by the MME 115 in step S620 include both the IPv4 and the IPv6 M1 addresses.

For example, steps 83*a*-83*b* in FIG. 8 explain an example of step S620 in additional detail. In step 83*a*, the MME 115 uses the M3 interface to send MBMS session start requests to MCEs included the mixed protocol service area SA specified in the MBMS session start request received by the MME 115 in step 82*a*. According to at least one example embodiment, the MBMS session start request sent from the MME 115 in step 83*a* may include the same data elements as the MBMS session start request received by the MME 115 in step 82*a* with the exception of the flow ID FID0 (e.g. the values TMGI1, SA, CTEID1, CTEID2, the first distribution IE corresponding to the IPv6 addresses, and the second distribution ID corresponding to the IPv4 addresses). For example, according to at least one example embodiment, the MME 115 includes the M1 IPv6 multicast destination address and source address along with CTEID1 in one instance of the M3 interface TNL information in the MBMS Start Request sent in step 83*a*; and the MME 115 includes the M1 IPv4 multicast destination address and source address along with CTEID2 in a second instance of the M3 interface TNL information in the same MBMS Start Request sent in step 83*a*.

In step 83*b*, the MCEs that received the MBMS session start requests sent from the MME 115 in step 83*a* send the MME 115 a MBMS session start response, and the MME 115 receives the response.

Further, step S625 is an optional step executed in scenarios where MCEs and eNBs corresponding to the MCEs are implemented by separate devices. In step S625, the MCEs use the M2 interface to forward the start requests received in step S620 to eNBs corresponding to the MCEs, and the eNBs respond by sending MBMS start responses back to the MCEs as is illustrated by steps 84*a*-84*d* of FIG. 8, which correspond to an example of step S625. For example, according to at least one example embodiment, the MCEs includes the M1 IPv6 multicast destination address and source address along with CTEID1 in one instance of M2 interface TNL information in the MBMS Start Request sent in steps 84*a* and 84*c*; and the MCEs include the M1 IPv4 multicast destination address and source address along with CTEID2 in a second instance of the M2 interface TNL information in the same MBMS start request sent in steps 84*a* and 84*c*.

In a scenario where an MCE and corresponding eNB are collocated, steps S625 and 84*a*-*d* may represent internal operations performed between logical nodes, of a single physical entity, corresponding respectively to the MCE and the eNB.

Returning to FIG. 6, in step S630, the BM-SC 105 sends a single MBMS content stream to the MBMS-GW 110, and the MBMS-GW 110 receives the stream. For example, as is shown in step 84*a* in FIG. 5, which corresponds to step S420, the BM-SC 105 may initiate a user plane data flow on the SGi-mb interface by sending a single SYNC PDU stream (e.g., a single IPv6 unicast stream) to the MBMS-GW 110 using the SGi-mb interface, and the MBMS-GW 110 receives the stream.

Returning to FIG. 6, in step S635, the MBMS-GW 110 sends two MBMS content streams via IPv6 and IPv4, respectively. The two MBMS content streams correspond to the content stream received by the MBMS-GW 110 from the MB-SC 105 in step S630. For example, as is shown in steps 85*b* and 85*c* in FIG. 8, which correspond to step S635, the MBMS-GW 110 may use the M1 interface to transmit an IPv6 multicast stream and an IPv4 multicast stream both having the same SYNC PDU and content included in the IPv6 stream sent to the MBMS-GW 110 in step 85*a*. For example, in step 85*b*, the MBMS-GW 110 may transmit the IPv6 multicast stream in a GTP tunnel with the first CTEID CTEID1 using, for example, the IPv6 M1 destination and source addresses identified in the MBMS session start request sent by the MBMS-GW 110 in step 82*a*; and in step 85*c*, the MBMS-GW 110 may transmit the IPv4 multicast stream in a GTP tunnel with the second CTEID CTEID2 using, for example, the IPv4 M1 destination and source addresses identified in the MBMS session start request sent by the MBMS-GW 110 in step 82*a*.

According to at least one example embodiment, steps 85*b* and 85*c* may be executed at the same time such that the MBMS-GW 110 sends the IPv6 multicast stream and the IPv4 multicast stream simultaneously. According to at least one example embodiment, the IPv6 multicast stream and the IPv4 multicast stream sent by the MBMS-GW 110 in step 85*b* and 85*c* are synchronized with each other.

For example, the user plane flow for steps 85*a*-*c* in the second example method for providing MBMS in a mixed protocol network may be the same as that described above with reference to FIG. 2.

Steps 86*a*-89*d* illustrate an example process for closing an MBMS session. For example, when the session initiated in step 81*a* expires, the BM-SC 105 uses, for example, the SGmb interface to send an RAR session stop request including the first TMGI TMGI1 and the first flow ID FID0 to the MBMS-GW 110 in step 86*a*. Next, the MBMS-GW 110 responds by sending a RAA session stop response in step 86*b*.

Next, the MBMS-GW 110 sends a MBMS session stop request including and the value FID0 to the MME 115 in step 87*a* using, for example, the Sm interface. In response to the MBMS session stop request, the MME 115 sends a MBMS session stop response to the MBMS-GW 110 in step 87*b*. Next, the MME 115 sends a MBMS session stop request to the MCEs in step 88*a* using, for example, the M3 interface. In response to the MBMS session stop requests, the MCEs send MBMS session stop responses to the MME 115 in step 88*b*. Next, in steps 89*a* and 89*c*, the MCEs send MBMS session stop requests to the IPv6 and IPv4 eNBs, respectively, using, for example, the M2 interface. The MCEs receive MBMS session stop responses from the IPv6 eNBs in step 89*b*. Further, the MCEs receive MBMS session stop responses from the IPv4 eNBs in step 89*d*.

For the purpose of simplicity, the first example method illustrated above with reference to FIGS. 4-6, and the second example method illustrated above with reference to FIGS. 7-8*b* are described with reference to only one MME, the MME 115. However, according to at least one example embodiment, the BM-SC 105 may select a plurality of MMEs for a particular session, and indicate this selection the MBMS-GW (for example, in any of steps S405, 51*a*, S610, 81*a* of FIGS. 4, 5, 6 and 8). Further, according to at least one example embodiment, the messages discussed herein as being sent to the MME 115 from the MBMS-GW 110 may be sent from the MBMS-GW 110 to the plurality of MMEs selected by the BM-SC 105 for the session. Further, messages described herein as being sent from the MME 115 to one or more MCEs may be sent from the plurality of MMEs selected by the BM-SC 105 for the session to MCEs. For example, for each one of the MMEs selected by the BM-SC 105 for the session, the selected MME may send messages to MCEs corresponding the selected MME.

Example embodiments being thus described, it will be obvious that embodiments may be varied in many ways. Such variations are not to be regarded as a departure from example embodiments, and all such modifications are intended to be included within the scope of example embodiments.

What is claimed:

1. A method of facilitating multimedia broadcast multicast services (MBMS) in a communications network including one or more first evolved node Bs (eNBs) and one or more second eNBs, the one or more first eNBs each having backhaul interfaces for a first internet protocol (IP) version, the one or more second eNBs each having backhaul interfaces for a second IP version, the method comprising:
   receiving, at the first network element, a first temporary mobile group identity (TMGI) and a first flow ID;
   selecting, at the first network element, a second flow ID different from the first flow ID;
   receiving, at a first network element, an initial MBMS content stream;
   generating, at the first network element, based on the initial MBMS content stream, a first MBMS content stream and a second MBMS content stream;
   transmitting the first MBMS content stream from the first network element to the one or more first eNBs using a first IP multicast address of the first IP version, the first TMGI, and the first flow ID; and
   transmitting the second MBMS content stream from the first network element to the one or more second eNBs using a second IP multicast address of the second IP version, the first TMGI, and the second flow ID.

2. The method of claim 1,
   wherein the one or more first eNBs and the one or more second eNBs are included in a same multicast-broadcast single-frequency network (MBSFN),
   wherein the generating a first MBMS content stream and a second MBMS content stream includes,
      generating a synchronization protocol (SYNC) layer of a protocol stack of the first MBMS content stream based on a SYNC layer of a protocol stack of the initial MBMS content stream, and
      generating a SYNC layer of a protocol stack of the second MBMS content stream based on the SYNC layer of the protocol stack of the initial MBMS content stream,
   wherein the transmitting the first MBMS content stream includes transmitting the first MBMS content stream from the network element to the one or more first eNBs via a first GTP tunnel using the first IP multicast address, and
   wherein the transmitting the second MBMS content stream includes transmitting the second MBMS content stream from the network element to the one or more second eNBs via a second GTP tunnel using the second IP multicast address,
   the first and second MBMS content streams being transmitted from the first network element simultaneously.

3. The method of claim 1, further comprising:
   sending a first MBMS session start message, the first MBMS session start message including,
      the first IP multicast address, and
      a first service area identifier identifying a first service area that has been assigned to only the one or more first eNBs; and
   sending a second MBMS session start message, the second MBMS session start message including,
      the second IP multicast address, and
      a second service area identifier identifying a second service area that has been assigned to only the one or more second eNBs,
   the one or more first eNBs each having M1 backhaul interfaces for the first internet protocol (IP) version, the one or more second eNBs each having M1 backhaul interfaces for the second IP version.

4. The method of claim 3, wherein the first network element is an MBMS gateway (MBMS-GW), and the method further comprises:
   receiving, at the MBMS-GW, a first session start message, the first session start message identifying both the first service area and the second service area, the first session start message being received from a broadband/multicast-service center (BM-SC).

5. The method of claim 4, wherein,
   the sending a first MBMS session start message includes sending the first MBMS session start message from the MBMS-GW to one or more mobility management entities (MMEs) associated with the one or more first eNBs upon receiving the first session start message from the BM-SC, and
   the sending a second MBMS session start message includes sending the second MBMS session start message from the MBMS-GW to one or more MMEs associated with the one or more second eNBs upon receiving the first session start message from the BM-SC.

6. The method of claim 5, further comprising:
   receiving or being configured with, at the MBMS-GW, IP version correspondence information indicating that the first service area corresponds to eNBs having M1 backhaul interfaces of the first IP version and the second service area corresponds to eNBs having M1 backhaul interfaces of the second IP version;
   generating, at the MBMS-GW, the first MBMS session start message and the second MBMS session start message by,
      inserting the first service area identifier, the first IP multicast address, the first flow ID and a first common tunnel endpoint ID identifying a first general packet radio service (GPRS) tunneling protocol (GTP) tunnel into the first MBMS session start message, based on the IP version correspondence information, and
      inserting the second service area identifier, the second multicast IP address, the second flow ID and a second common tunnel endpoint ID identifying a second GTP tunnel in the second MBMS session start message, based on the IP version correspondence information.

7. The method of claim 6, wherein,
   the receiving a first session start message includes receiving, at the MBMS-GW, the first flow ID in the first session start message,
   the first flow ID being one of a plurality of flow IDs included in a first pool of flow IDs assigned to the BM-SC,
   the second flow ID being one of a plurality of flow IDs included in a second pool of flow IDs assigned to the MBMS-GW, no flow IDs included in the first pool being included in the second pool, and no flow IDs included in the second pool being included in the first pool.

8. The method of claim 7, further comprising:

upon receiving a first session update or stop request from the BM-SC at the MBMS-GW,
sending a first MBMS session update or stop request to the one or more MMEs associated with the one or more first eNBs, the first MBMS session update including the first flow ID; and
sending a second MBMS session update or stop request to the one or more MMEs associated with the one or more second eNBs, the second MBMS session update including the second flow ID.

9. The method of claim 1, further comprising:

sending a MBMS session start message, the MBMS session start message including the first IP multicast address, the second IP multicast address, a first common tunnel endpoint ID identifying a first general packet radio service (GPRS) tunneling protocol (GTP) tunnel, and the second common tunnel endpoint ID identifying a second GTP tunnel.

10. The method of claim 9, wherein the first network element is an MBMS gate way (MBMS-GW), and the method further comprises:

receiving, at the MBMS-GW, a first session start message, the first session start message being received from a broadband/multicast-service center (BM-SC),
the first session start message identifying at least one of,
a first service area to which at least one of the one or more first eNBs and at least one of the one or more second eNBs are assigned, and
a plurality of service areas including a service area to which at least one of the one or more first eNBs have been assigned and a service area to which at least one of the one or more second eNBs have been assigned,
the one or more first eNBs each having M1 backhaul interfaces for the first internet protocol (IP) version,
the one or more second eNBs each having M1 backhaul interfaces for the second IP version.

11. The method of claim 10, wherein, the sending a MBMS session start message includes sending the MBMS session start message from the MBMS-GW to one or more mobility management entities (MMEs) upon receiving the first session start message from the BM-SC, each of the one or more MMEs being associated with at least one eNB from among the one or more first eNBs or at least one eNB from among the one or more second eNBs.

12. The method of claim 10 further comprising:

receiving or being configured with, at the MBMS-GW, IP version correspondence information indicating which service areas correspond to which M1 backhaul interface IP versions.

13. A method of facilitating multimedia broadcast multicast services (MBMS) in a communications network including one or more first evolved node Bs (eNBs) and one or more second eNBs, the one or more first eNBs each having backhaul interfaces for a first internet protocol (IP) version, the one or more second eNBs each having backhaul interfaces for a second IP version, the method comprising:

receiving, at a mobility management entity (MME), a first MBMS session start message, the MBMS session start message including a first IP multicast address of the first IP version, a second IP multicast address of the second IP version, a first common tunnel endpoint ID identifying a first general packet radio service (GPRS) tunneling protocol (GTP) tunnel, and a second common tunnel endpoint ID identifying a second GTP tunnel, the first MBMS session start message being received from an MBMS gateway (MBMS-GW), the first and second IP versions being different from each other, the first and second common tunnel endpoint IDs being different from each other; and sending, from the MME to one or more multi-cell/multicast coordination entities (MCEs), a second MBMS session start message, the second MBMS session start message including the first IP multicast address, the second IP multicast address, the first common tunnel endpoint ID, and the second common tunnel endpoint ID, each of the one or more MCEs corresponding to one or both of the one or more first eNBs and the one or more second eNBs.

14. A method of facilitating multimedia broadcast multicast services (MBMS) in a communications network the method comprising:

receiving, at a first evolved node B (eNB), a first MBMS session start message, the MBMS session start message including a first IP multicast address of a first IP version, a second IP multicast address of a second IP version, a first common tunnel endpoint ID identifying a first general packet radio service (GPRS) tunneling protocol (GTP) tunnel, and a second common tunnel endpoint ID identifying a second GTP tunnel, the first MBMS session start message being received from a mobility management entity (MME), the first and second IP versions being different from each other, the first and second common tunnel endpoint IDs being different from each other;

if the first eNB has a backhaul interface of the first IP version type,
selecting, at the first eNB, the first IP multicast address; and
receiving, at the first eNBs, a first MBMS content stream from an MBMS gateway (MBMS-GW) via the first GTP tunnel using the first IP multicast address; and if the first eNB has a backhaul interface of the second IP version type,
selecting, at the first eNB, the second IP multicast address; and
receiving, at the first eNBs, a second MBMS content stream from the MBMS gateway (MBMS-GW) via the second GTP tunnel using the second IP multicast address.

15. A network element comprising:

a processor, the network element being programmed to execute operations for facilitating multimedia broadcast multicast services (MBMS) in a communications network including one or more first evolved node Bs (eNBs) and one or more second eNBs, the one or more first eNBs each having backhaul interfaces for a first Internet protocol (IP) version, the one or more second eNBs each having backhaul interfaces for a second IP version, the operations including,
receiving, at the network element, a first temporary mobile group identity (TMGI) and a first flow ID;
selecting, at the network element, a second flow ID different from the first flow ID;
receiving, at a the network element, an initial MBMS content stream;

generating, at the network element, based on the initial MBMS content stream, a first MBMS content stream and a second MBMS content stream;

transmitting the first MBMS content stream from the network element to the one or more first eNBs using a first multicast IP address of the first IP version, the first TMGI, and the first flow ID; and transmitting the second MBMS content stream from the network element to the one or more second eNBs using a second IP multicast address of the second IP version, the first TMGI, and the second flow ID.

16. The network element of claim 15, wherein the network element is programmed such that, transmitting the first MBMS content stream includes transmitting the first MBMS content stream from the network element to the one or more first eNBs via a first GTP tunnel using the first IP multicast address, transmitting the second MBMS content stream includes transmitting, simultaneously with the first MBMS content stream, the second MBMS content stream from the network element to the one or more second eNBs via a second GTP tunnel using the second IP multicast address, and when the one or more first eNBs and the one or more second eNBs are included in a same multicast-broadcast single-frequency network (MBSFN), the operation of generating a first MBMS content stream and a second MBMS content stream includes, generating a synchronization protocol (SYNC) layer of a protocol stack of the first MBMS content stream based on a SYNC layer of a protocol stack of the initial MBMS content stream, and generating a SYNC layer of a protocol stack of the second MBMS content stream based on the SYNC layer of the protocol stack of the initial MBMS content stream.

17. The network element of claim 15, wherein the operations further include, sending a first MBMS session start message, the first MBMS session start message including,
the first IP multicast address, and
a first service area identifier identifying a first service area that has been assigned to only the one or more first eNBs; and sending a second MBMS session start message, the second MBMS session start message including,
the second IP multicast address, and
a second service area identifier identifying a second service area that has been assigned to only the one or more second eNBs, the one or more first eNBs each having M1 backhaul interfaces for the first internet protocol (IP) version, the one or more second eNBs each having M1 backhaul interfaces for the second IP version.

18. The network element of claim 17, wherein the first network element is an MBMS gateway (MBMS-GW), and the operations further include, receiving, at the MBMS-GW, a first session start message, the first session start message being received from a broadband/multicast-service center (BM-SC), and identifying, in the first session start message, both the first service area and the second service area.

19. The MBMS-GW of claim 18, wherein the MBMS-GW is programmed such that, the operation of sending a first MBMS session start message includes sending the first MBMS session start message from the MBMS-GW to one or more mobility management entities (MMEs) associated with the one or more first eNBs upon receiving to the first session start message from the BM-SC, and the operation of sending a second MBMS session start message includes sending the second MBMS session start message from the MBMS-GW to one or more MMEs associated with the one or more second eNBs upon receiving the first session start message from the BM-SC.

20. The MBMS-GW of claim 19, wherein the operations further include, receiving or being configured with, at the MBMS-GW, IP version correspondence information indicating that the first service area corresponds to eNBs having M1 backhaul interfaces of the first IP version and the second service area corresponds to eNBs having M1 backhaul interfaces of the second IP version; and generating, at the MBMS-GW, the first MBMS session start message and the second MBMS session start message by, inserting the first service area identifier, the first IP multicast address, and the first flow ID and a first common tunnel endpoint ID identifying a first general packet radio service (GPRS) tunneling protocol (GTP) tunnel into the first MBMS session start message, based on the IP version correspondence information, and inserting the second service area identifier, the second IP multicast address, and the second flow ID and a second common tunnel endpoint ID identifying a second GTP tunnel in the second MBMS session start message, based on the IP version correspondence information.

21. The MBMS-GW of claim 20, wherein the MBMS-GW is programmed such that, the operation of receiving a first session start message includes identifying, at the MBMS-GW, the first flow ID included in the first session start message, the first flow ID being one of a plurality of flow IDs included in a first pool of flow IDs assigned to the BM-SC, the second flow ID being one of a plurality of flow IDs included in a second pool of flow IDs assigned to the MBMS-GW, no flow IDs included in the first pool being included in the second pool, and no flow IDs included in the second pool being included in the first pool.

22. The MBMS-GW of claim 21, wherein the operations further include, upon receiving a first session update or stop request from the BM-SC at the MBMS-GW, sending a first MBMS session update or stop request to the one or more MMEs associated with the one or more first eNBs, the second MBMS session update including the first flow ID; and sending a second MBMS session update or stop request to the one or more MMEs associated with the one or more second eNBs, the third MBMS session update including the second flow ID.

23. The network element of claim 15, wherein the operations further include sending a MBMS session start message, the MBMS session start message including the first IP multicast address, the second IP multicast address, a first common tunnel endpoint ID identifying a first general packet radio service (GPRS)

tunneling protocol (GTP) tunnel, and a second common tunnel endpoint ID identifying a second GTP tunnel.

24. The network element of claim 23, wherein the network element is an MBMS gateway (MBMS-GW), and the operations further include,
   receiving, at the MBMS-GW, a first session start message, the first session start message being received from a broadband/multicast-service center (BM-SC); and
   identifying, in the first session start message, at least one of,
      a first service area to which at least one of the one or more first eNBs and at least one of the one or more second eNBs are assigned, and
      a plurality of service areas including a service area to which at least one of the one or more first eNBs have been assigned and a service area to which at least one of the one or more second eNBs have been assigned,
      the one or more first eNBs each having M1 backhaul interfaces for the first internet protocol (IP) version, the one or more second eNBs each having M1 backhaul interfaces for the second IP version.

25. The MBMS-GW of claim 24, wherein,
   the operation of sending a MBMS session start message includes sending the MBMS session start message from the MBMS-GW to one or more mobility management entities (MMEs) upon receiving the first session start message from the BM-SC, each of the one or more MMEs being associated with at least one eNB from among the one or more first eNBs or at least one eNB from among the one or more second eNBs.

26. The MBMS-GW of claim 24 wherein the operations further include,
   receiving or being configured with, at the MBMS-GW, IP version correspondence information indicating which service areas correspond to which M1 backhaul interface IP versions.

* * * * *